United States Patent
Tsunashima

(10) Patent No.: US 11,837,233 B2
(45) Date of Patent: Dec. 5, 2023

(54) INFORMATION PROCESSING DEVICE TO AUTOMATICALLY DETECT A CONVERSATION

(71) Applicant: SONY CORPORATION, Tokyo (JP)

(72) Inventor: Nobuhiro Tsunashima, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 174 days.

(21) Appl. No.: 16/959,884

(22) PCT Filed: Jan. 10, 2019

(86) PCT No.: PCT/JP2019/000597
§ 371 (c)(1),
(2) Date: Jul. 2, 2020

(87) PCT Pub. No.: WO2019/139101
PCT Pub. Date: Jul. 18, 2019

(65) Prior Publication Data
US 2020/0335105 A1   Oct. 22, 2020

(30) Foreign Application Priority Data

Jan. 12, 2018 (JP) .................................. 2018-003778

(51) Int. Cl.
*G10L 15/25* (2013.01)
*G10L 15/22* (2006.01)
(Continued)

(52) U.S. Cl.
CPC .............. *G10L 15/24* (2013.01); *G06V 20/00* (2022.01); *G06V 20/35* (2022.01); *G06V 40/161* (2022.01);
(Continued)

(58) Field of Classification Search
CPC ........................... G10L 15/25; G10L 2015/25
See application file for complete search history.

(56) References Cited

U.S. PATENT DOCUMENTS 7,386,799 B1 * 6/2008 Clanton .................. A63F 13/12
715/861
2002/0101505 A1 * 8/2002 Gutta ...................... H04N 7/15
348/14.07
(Continued)

FOREIGN PATENT DOCUMENTS

EP    2 012 304 A1    1/2009
GB    2 351 628 A     1/2001
(Continued)

OTHER PUBLICATIONS

Sugiyama, Takaaki, et al. "Estimating response obligation in multi-party human-robot dialogues." 2015 IEEE-RAS 15th International Conference on Humanoid Robots (Humanoids). IEEE, 2015. (Year: 2015).*

(Continued)

*Primary Examiner* — Jialong He
(74) *Attorney, Agent, or Firm* — Oblon, McClelland, Maier & Neustadt, L.L.P.

(57) ABSTRACT

The situation of a conversation can be allowed to be grasped in more detail.
A statement of each participant participating in a conversation is detected by processing a voice signal. The state of each participant participating in the conversation, for example, a direction in which each participant is looking is detected by processing an image signal. The state and existence of a conversation are determined on the basis of the statement of each participant and the state of each participant. The state and existence of a conversation can be determined with higher accuracy than in a technology that determines the state and existence of a conversation only by statements of participants.

19 Claims, 19 Drawing Sheets

(51) Int. Cl.

| | | |
|---|---|---|
| *G10L 15/24* | (2013.01) | |
| *G10L 15/20* | (2006.01) | |
| *G10L 15/26* | (2006.01) | |
| *G06V 20/00* | (2022.01) | |
| *G06V 40/16* | (2022.01) | |
| *G06V 40/19* | (2022.01) | |

(52) U.S. Cl.
CPC ............ *G06V 40/172* (2022.01); *G06V 40/19* (2022.01); *G10L 15/20* (2013.01); *G10L 15/22* (2013.01); *G10L 15/26* (2013.01); *G10L 2015/227* (2013.01)

(56) References Cited

U.S. PATENT DOCUMENTS

| | | | |
|---|---|---|---|
| 2002/0184017 A1* | 12/2002 | Lee | G10L 25/87 704/236 |
| 2004/0122673 A1* | 6/2004 | Park | G10L 15/24 704/E15.04 |
| 2009/0138828 A1* | 5/2009 | Schultz | G06Q 10/10 715/853 |
| 2009/0210804 A1* | 8/2009 | Kurata | A63F 13/30 715/757 |
| 2010/0134626 A1* | 6/2010 | Icho | G06F 3/0481 348/158 |
| 2010/0315482 A1* | 12/2010 | Rosenfeld | H04L 65/403 348/E7.083 |
| 2011/0320536 A1* | 12/2011 | Lobb | G06Q 50/01 709/205 |
| 2012/0295708 A1* | 11/2012 | Hernandez-Abrego | A63F 13/10 463/36 |
| 2015/0189233 A1* | 7/2015 | Carpenter | H04N 7/15 348/14.08 |
| 2017/0041556 A1* | 2/2017 | Aiba | H04N 7/147 |
| 2017/0127021 A1* | 5/2017 | Frank | G06V 40/107 |
| 2017/0301037 A1* | 10/2017 | Baughman | G06Q 10/10 |
| 2018/0077383 A1* | 3/2018 | Akao | H04M 9/00 |
| 2018/0130140 A1* | 5/2018 | Xu | H04L 29/08 |

FOREIGN PATENT DOCUMENTS

| | | | |
|---|---|---|---|
| JP | 2000-184345 A | | 6/2000 |
| JP | 2010-266522 A | | 11/2010 |
| JP | 2011-237965 A | | 11/2011 |
| JP | 2013-58221 A | | 3/2013 |
| JP | 2016004066 A | * | 1/2016 |
| JP | 2016-103081 A | | 6/2016 |
| JP | 2017-9825 A | | 1/2017 |
| WO | WO 2008/139717 A1 | | 11/2008 |
| WO | WO 2009/004731 A1 | | 1/2009 |
| WO | WO-2011105003 A1 | | 9/2011 |
| WO | WO2016/158014 | * | 10/2016 |

OTHER PUBLICATIONS

Otsuka, Kazuhiro, et al. "A realtime multimodal system for analyzing group meetings by combining face pose tracking and speaker diarization." Proceedings of the 10th international conference on Multimodal interfaces. 2008. (Year: 2008).*

Rich, Charles, et al. "Recognizing engagement in human-robot interaction." 2010 5th ACM/IEEE International Conference on Human-Robot Interaction (HRI). IEEE, 2010. (Year: 2010).*

International Search Report dated Mar. 19, 2019 in PCT/JP2019/000597, 2 pages.

* cited by examiner

INFORMATION PROCESSING DEVICE TO AUTOMATICALLY DETECT A CONVERSATION

TECHNICAL FIELD

The present technology relates to an information processing device, an information processing method, and a program, and in more detail, to an information processing device and the like for grasping the situation of a conversation constructed by a plurality of participants (discussion, a conference, a group work, active learning, or the like).

BACKGROUND ART

In a conversation, it is very important to grasp the situation of the conversation. For example, Patent Document 1 proposes a technology of recording and displaying the speech duration of a conversation participant. Furthermore, for example, Patent Document 2 proposes a technology of presenting a correlation diagram by grasping a conversation situation from voice data obtained by name tag-type sensors worn by a plurality of participants, and the like. These technologies can take a voice and a motion such as a nod by an acceleration sensor, but have been insufficient.

CITATION LIST

Patent Document

Patent Document 1: Japanese Patent Application Laid-Open No. 4-323689
Patent Document 2: Japanese Patent Application Laid-Open No. 2013-058221

SUMMARY OF THE INVENTION

Problems to be Solved by the Invention

An object of the present technology is to allow the situation of a conversation to be grasped in more detail.

Solutions to Problems

A concept of the present technology is
an information processing device including:
a voice processing unit that detects, from a voice signal, statements of a plurality of participants of a conversation;
an image processing unit that detects, from an image signal, states of the plurality of participants of the conversation; and
a determination unit that determines a state of the conversation on the basis of the statements of the plurality of participants and the states of the plurality of participants.

In the present technology, statements of a plurality of participants of a conversation are detected from a voice signal by the voice processing unit. Furthermore, the states of the plurality of participants of the conversation are detected from an image signal. Then, the state of the conversation is determined by the determination unit on the basis of the statements of the plurality of participants and the states of the plurality of participants.

For example, the state of the conversation may include a conversational relationship between the participants of the conversation. Furthermore, for example, the state of the conversation may include at least one of content of the statements, a number of times of the statements, or a duration of the statements. In addition, for example, the state of the conversation may include establishment of the conversation. In this case, for example, it may be determined that the conversation has been established, when one of the participants is talking while looking at another party of the conversation.

For example, the image processing unit may detect a direction in which one of the participants is looking, as one of the states of the participants. Then, in this case, for example, the image processing unit may detect a direction in which the one of the participants is looking, from an orientation of a face or a direction of a line of sight of the one of the participants.

For example, the determination unit may determine that there is a conversation between a first participant and a second participant, when a statement of the second participant is made after the first participant has made a statement, and a direction in which the second participant is looking coincides with a direction of the first participant.

As described above, in the present technology, the state of a conversation is determined on the basis of statements of a plurality of participants of the conversation detected from a voice signal, and the states of the plurality of participants of the conversation detected from an image signal. For this reason, the state of a conversation can be determined with higher accuracy than in a technology that determines the state of a conversation only by statements of participants.

Note that, for example, the present technology may further include an image generation unit that generates a planar map image of a space used for the conversation, in which this planar map image may contain a participant display indicating each of the participants participating in the conversation, and this planar map image may contain a conversation line connecting two corresponding participant displays on the basis of the conversation that has been detected. This makes it possible to visually recognize, for example, who had a conversation with whom, with ease.

For example, the image processing unit may process the image signal to further detect a position of each of the participants participating in the conversation, and the image generation unit may alter a position of the participant display indicating each of the participants on the planar map image, according to this detected position of each of the participants. This makes it possible to visually recognize at what position each of the participants participating in the conversation is located, with ease.

Furthermore, for example, the image generation unit may alter a position of the participant display indicating the each of the participants on the planar map image, according to a number of conversations of the each of the participants. In this case, for example, the image generation unit may arrange a position of the participant display indicating the each of the participants closer to a center of the planar map image as a number of conversations increases. This makes it possible to visually recognize who has a larger number of conversations, with ease. In addition, in this case, for example, the image generation unit may make an interval between participant displays of two participants nearer as a number of conversations between these two participants increases. This makes it possible to visually recognize who has a larger number of conversations with whom, with ease.

For example, the participant display may have a size according to a number of statements of a corresponding participant. Furthermore, for example, the participant display may be appended with a character indicating a number of statements of a corresponding participant. This makes it possible to visually recognize what degree a number of statements of each of the participants has, with ease.

For example, the conversation line may have a thickness according to a number of conversations between corresponding participants. Furthermore, for example, the conversation line may be appended with a character indicating a number of conversations between corresponding participants. This makes it possible to visually recognize what degree a number of conversations between every two participants has, with ease.

For example, a display unit that displays the planar map image generated by the image generation unit may be further provided. This makes it possible to check the planar map image on the display unit. Furthermore, a server that holds, for example, the planar map image generated by the image generation unit may be further provided. This makes it possible to reproduce and check a past planar map image from the server. In addition, a communication unit that transmits, for example, the planar map image generated by the image generation unit to a mobile terminal may be further provided. This allows the mobile terminal to check the planar map image.

Effects of the Invention

According to the present technology, the situation of a conversation can be grasped in more detail. Note that the effects described herein are not necessarily limited and any effects described in the present disclosure may be applied.

MODE FOR CARRYING OUT THE INVENTION

Modes for carrying out the invention (hereinafter, referred to as "embodiments") will be described below. Note that the description will be given in the following order.
1. First Embodiment
2. Second Embodiment
3. Modifications 1. First Embodiment

[Information Processing Device]

Figure 1:
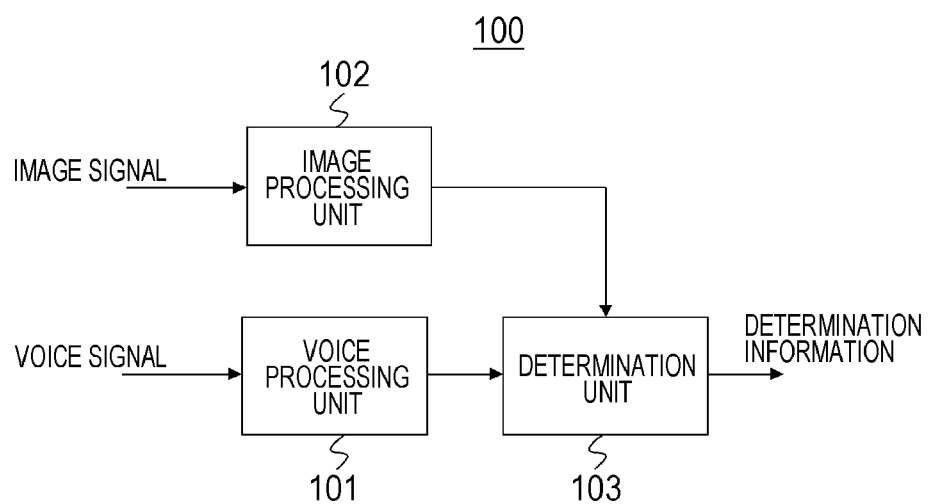
FIG. 1 is a block diagram illustrating a configuration example of an information processing device serving as a first embodiment.

FIG. 1 illustrates a configuration example of an information processing device 100 serving as a first embodiment. This information processing device 100 includes a voice processing unit 101, an image processing unit 102, and a determination unit 103.

The voice processing unit 101 is supplied with a voice signal obtained by detecting the voice of each participant participating in a conversation (discussion, a conference, a group work, active learning, or the like) with a microphone. In this case, the voice may be detected using a microphone attached to each participant, or the voice may be detected using a microphone array constituted by a plurality of microphones.

The voice processing unit 101 detects statements of a plurality of participants participating in the conversation from the voice signal. In this case, for example, the sound volume is measured from the voice signal for each participant, and in a case where a state with a measured sound volume equal to or higher than a threshold value continues for a certain period of time or longer, it is determined that a statement is made. In a case where a state with a measured sound volume equal to or higher than the threshold value is kept for less than the certain period of time, the utterance is regarded as relating to consent, denial, a nodding response, or the like, and it is determined that no statement is made.

The image processing unit 102 is supplied with an image signal obtained by capturing an image of a participant participating in the conversation with a camera. In this case, a camera capable of imaging the entire surroundings, such as a 360-degree camera, may be arranged at the center of all participants to image each participant, or a plurality of cameras may be arranged to cover the entire surroundings to image each participant.

The image processing unit 102 detects the states of a plurality of participants participating in the conversation from the image signal. The state of the participant detected in this manner is a state required to determine the state and existence of a conversation from a statement of this participant. For example, the state of the participant includes a direction in which the participant is looking. In order to detect a direction in which the participant is looking, the image processing unit 102 detects the orientation of the face of the participant or detects the direction of the line of sight of the participant by an image process.

The determination unit 103 determines the state and existence of a conversation on the basis of statements of the plurality of participants detected by the voice processing unit 101 and the states of the plurality of participants detected by the image processing unit 102. For example, the state of the conversation is a conversational relationship between participants of the conversation. Furthermore, for example, the state of the conversation includes at least one of the content of statements, the number of times of statements, or the duration of statements. In addition, for example, the state of the conversation is the establishment of a conversation. For example, the determination unit determines that the conversation has been established, when a participant is talking while looking at another party of the conversation.

Besides, for example, the determination unit determines that there is a conversation between a first participant and a second participant, when a statement of the second participant is made after the first participant has made a statement or immediately before the statement finishes, and a direction in which the second participant is looking coincides with the direction of the first participant. Note that, even when a direction in which the second participant is looking does not coincide with the direction of the first participant, it may be determined that there is a conversation. For example, it can be determined that there is a conversation even when the second participant makes an utterance after the first participant makes a statement, or when the second participant's face moves up and down (nodding response) after the first participant makes a statement.

The action of the information processing device 10 illustrated in FIG. 1 will be briefly described. A voice signal obtained by detecting the voice of each participant participating in a conversation with a microphone is supplied to the voice processing unit 101. In this voice processing unit 101, the voice signal is processed and a statement of each participant participating in the conversation is detected. Furthermore, an image signal obtained by capturing an image of each participant participating in the conversation with a camera is supplied to the image processing unit 102. In this image processing unit 102, the image signal is processed and the state of each participant participating in the conversation, for example, a direction in which each participant is looking is detected.

The statement of each participant participating in the conversation detected by the voice processing unit 101 and the state of each participant participating in the conversation detected by the image processing unit 102 are supplied to the determination unit 103. In the determination unit 103, the state and existence of a conversation are determined on the basis of the statement of each participant and the state of each participant, and determination information is obtained.

As described above, in the information processing device 100 illustrated in FIG. 1, the state and existence of a conversation are determined on the basis of a statement of each participant participating in the conversation and a state detected by an image process. For this reason, the state and existence of a conversation can be determined with higher accuracy than in a technology that determines the state and existence of a conversation only by statements of participants.

2. Second Embodiment

[Information Processing Device]

Figure 2:
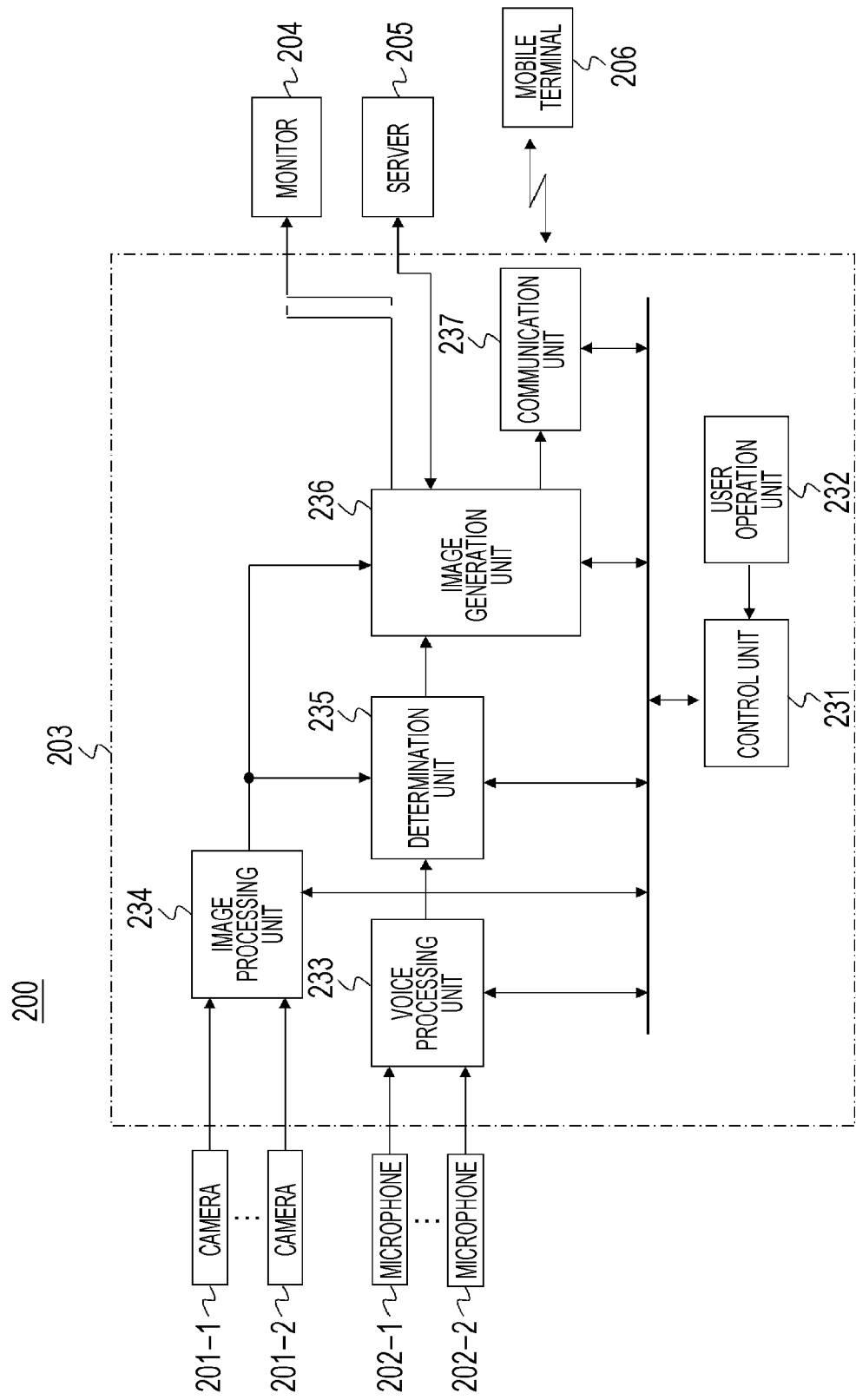
FIG. 2 is a block diagram illustrating a configuration example of an information processing device serving as a second embodiment.

FIG. 2 illustrates a configuration example of an information processing device 200 serving as a second embodiment. This information processing device 200 includes N (N is an integer) cameras 201-1 to 201-N, M (M is an integer) microphones 202-1 to 202-M, an image and voice control system 203, a monitor 204, a server 205, and a mobile terminal 206.

The cameras 201-1 to 201-N are for capturing images of participants participating in a conversation. The cameras 201-1 to 201-N are installed so as to image the participants participating in the conversation, especially the faces. In this case, a camera capable of imaging the entire surroundings, such as a 360-degree camera, may be installed at the center of the participants, or a plurality of cameras may be installed such that the entire surroundings can be imaged.

Figure 3:
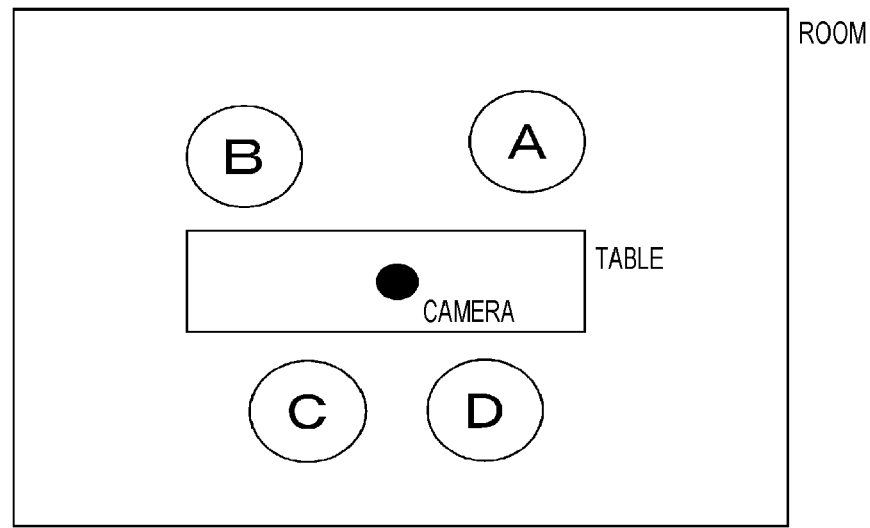
FIG. 3 is a diagram illustrating an example of a planar map of a room in which a conversation takes place.

FIG. 3 illustrates an example of a planar map of a room in which a conversation takes place. In this example, the circle displays labeled "A" to "D" indicate participant displays indicating participants participating in the conversation, and each participant is located in the vicinity of a table placed in the center of the room. In this example, a 360-degree camera capable of imaging the entire surroundings is installed on the desk. In this case, adjustment is made such that the orientation and position of the camera on the planar map are put in a constant state. Note that, although this example illustrates a state in which there is one table in the room and four participants are located around the table, the number and shape of the tables, the number of participants, and the like are arbitrary.

Figure 4:
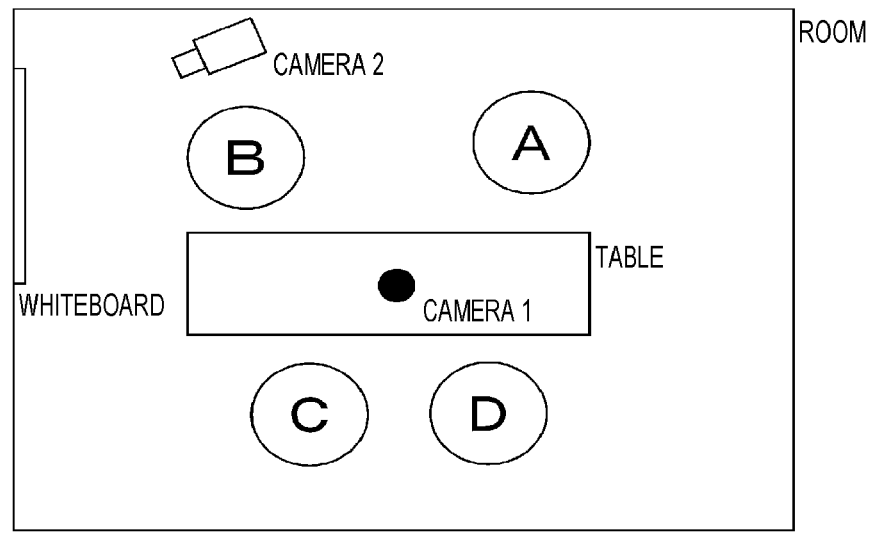
FIG. 4 is a diagram illustrating another example of the planar map of a room in which a conversation takes place.

FIG. 4 illustrates another example of the planar map of a room in which a conversation takes place. In this example, the circle displays labeled "A" to "D" indicate participant displays in a conversation, and each participant is located in the vicinity of a desk placed in the center of the room. In this example, a camera 1 that is a 360-degree camera capable of imaging the entire surroundings is installed on top of a desk, and additionally a camera 2 is installed so as to capture a whiteboard present in the periphery of the room. This camera 2 can image the whiteboard, and furthermore can also image the face of a participant who performed writing on the whiteboard when this participant explains the written contents in front of the whiteboard. In this case, the positions and orientations of the cameras on the planar map are adjusted when the cameras 1 and 2 are installed.

Returning to FIG. 2, the microphones 202-1 to 202-M are for detecting the voice of each participant participating in the conversation. In this case, the microphones 202-1 to 202-M may be microphones attached to the respective participants, or may be a plurality of microphones constituting a microphone array that detects the voice of each participant.

The image and voice control system 203 processes the image signals obtained by the cameras 201-1 to 201-N and the voice signals obtained by the microphones 202-1 to 202-M, and generates a planar map image of a room in which a conversation takes place. The image and voice control system 203 supplies the generated planar map image to the monitor 204, and displays the planar map image on the monitor 204.

Furthermore, the image and voice control system 203 supplies the generated planar map image to the mobile terminal 206 instead of the monitor 204 or together with the monitor 204 according to an operation of a user, and displays the planar map image on the mobile terminal 206. In addition, the image and voice control system 203 supplies the generated planar map image to the server 205 to record the supplied planar map image therein, and furthermore, reproduces the planar map image from the server 205 according to an operation of a user to supply the planar map image to the monitor 204 or the mobile terminal 206 and display the reproduced planar map image thereon.

The image and voice control system 203 includes a control unit 231, a user operation unit 232, a voice processing unit 233, an image processing unit 234, a determination unit 235, an image generation unit 236, and a communication unit 237. The control unit 231 controls the action of each unit of the image and voice control system 203. The user operation 232 is a key, a button, a touch panel, a remote controller, or the like for the user to perform various operations.

The face of each participant can be registered in the image processing unit 234 at the stage of advance preparations. Here, in a case where the voice of each participant is detected by attaching a microphone to each participant, the face of each registered participant may be associated with the number of the microphone attached to each participant. With this configuration, voice detection associated with each participant is enabled.

When the face image of each participant is registered, the face of each participant is imaged with a camera. At this time, the dimensions of the participant's face and a distance from the camera to this participant are measured in association with each other. This makes it possible to estimate the distance from the camera to the participant on the basis of the dimensions of the participant's face imaged by the camera.

Note that, in a case where it is difficult to estimate the distance from the camera to the participant by the above-described method, or in a case where it is not necessary to estimate the distance, it is also conceivable to treat the distance from the camera to the participant as fixed. Furthermore, it is also conceivable to measure the distance from the camera to the participant by constructing a stereo camera using two or more cameras. This technology is described in, for example, "Japanese Patent Application Laid-Open No. 62-080768", but it goes without saying that any methods other than this technology may be employed.

The image processing unit 234 performs a face sensing process on the image signal (captured image) to specify the position and state of each participant's face, for example, a direction in which each participant is looking. The direction in which each participant is looking is specified by specifying the orientation of the face or the direction of the line of sight. The technology for specifying the face position and the line of sight is described in, for example, "Japanese Patent Application Laid-Open No. 2012-226665", but it goes without saying that any methods other than this technology may be employed. In this case, the image processing unit 234 performs personal verification by comparing the face sensed in the face sensing process with the face registered in advance, and finds out which participant's face each sensed face coincides with.

Furthermore, the image processing unit 234 specifies the position (direction and distance) of a predetermined participant on the planar map on the basis of the position and dimensions of the participant's face within the imaging angle of view. In this case, the direction of the participant viewed from the camera on the planar map can be specified from the position of the participant's face within the imaging angle of view. In addition, as described above, since the dimensions of the participant's face and the distance from the camera to the participant are measured in association with each other at the time of registration, the distance from the camera to the participant can be specified from a ratio between these dimensions of the face at the time of registration and the current dimensions of the face.

Note that, in the above, the face sensing process is performed on the image captured by the camera to specify the position and the like of the face of each participant, but the participant is not always facing the camera. For example, there is a case where the image captured by the camera does not contain the participant's face, for example, when the participant is writing on the whiteboard during a conversation. In a case where the face of the participant cannot be sensed, a point where the face was last sensed is fixed as the position of the participant (face position). Alternatively, in this case, for example, object tracing may be performed from a point where the face became invisible, using an object tracking technology, and the position of the participant (face position) by the face on the planar map may be updated. This object tracking technology is described in, for example, "Japanese Patent Application Laid-Open No. 6-169458", but it goes without saying that any methods other than this technology may be employed.

The voice processing unit 233 processes a voice signal corresponding to each participant, and detects a statement of each participant participating in the conversation. Here, in a case where the voice is detected using a microphone attached to each participant, the voice processing unit 233 can easily grasp to which participant each detected voice belongs. Accordingly, matching between the voice and the participant is performed.

Meanwhile, in a case where the voice is detected by a microphone array, the voice processing unit 233 can grasp to which participant each detected voice belongs, as follows. That is, for example, the microphone array is installed at or in the periphery of the same position as a 360-degree camera capable of imaging the entire surroundings, and detects a voice while simultaneously detecting a direction in which the detected voice is emitted. Therefore, the voice processing unit 233 refers to position information on each participant's face detected by the image processing unit 234 as described above, and grasps to which participant the voice detected by the microphone array belongs. Accordingly, matching between the voice and the participant is performed. Note that the technology of detecting the direction of the voice using the microphone array is described in, for example, "Japanese Patent Application Laid-Open No. 9-251299", but it goes without saying that any methods other than this technology may be employed.

The voice processing unit 233 processes a voice signal corresponding to each participant, and detects a statement of each participant participating in the conversation. In this case, for example, the sound volume is measured from the voice signal for each participant, and in a case where a state with a measured sound volume equal to or higher than a threshold value continues for a certain period of time or longer, it is determined that a statement is made. In a case where a state with a measured sound volume equal to or higher than the threshold value is kept for less than the certain period of time, the utterance is regarded as relating to consent, denial, a nodding response, or the like, and it is determined that no statement is made.

The determination unit 235 detects a conversation on the basis of a statement of each participant obtained by the voice processing unit 233 and the state of each participant obtained by the image processing unit 234. In this case, for example, it is determined that there is a conversation between a first participant and a second participant, when a statement of the second participant is made after the first participant has made a statement or immediately before the statement finishes, and a direction in which the second participant is looking coincides with the direction of the first participant.

The image generation unit 236 generates a planar map image of a space such as a room used for conversation. In this case, the image generation unit 236 adds, to this planar map image, a participant display indicating each participant participating in the conversation detected by the image processing unit 234. Then, the image generation unit 236 dynamically alters the position of this participant display according to the position of the relevant participant (face position) specified by the image processing unit 234. Furthermore, the image generation unit 236 adds, to this planar map image, a conversation line connecting two corresponding participant displays, on the basis of conversation determination information from the determination unit 235.

Figure 5:
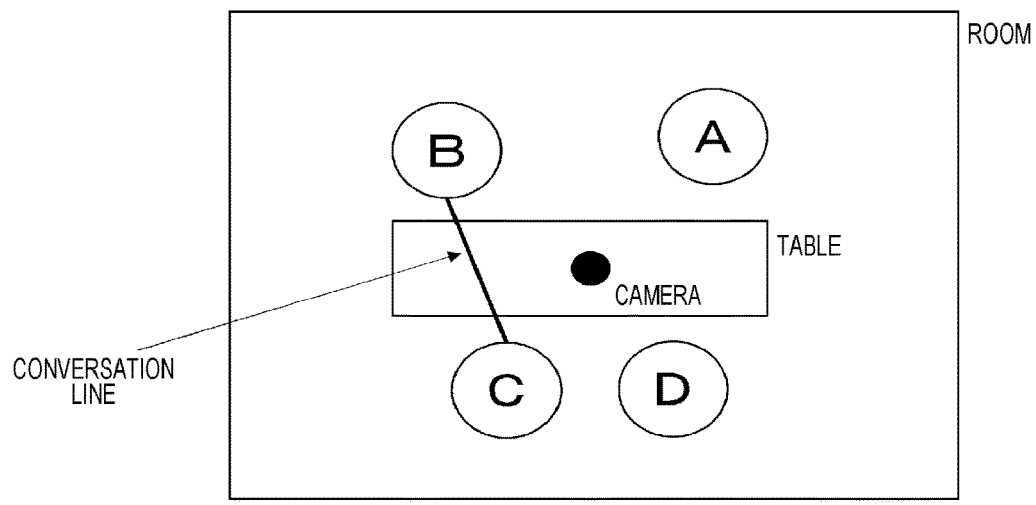
FIG. 5 is a diagram illustrating an example of a planar map image generated by an image generation unit.

FIG. 5 illustrates an example of the planar map image generated by the image generation unit 236. In this example, the circle displays labeled "A" to "D" indicate participant displays indicating participants participating in the conversation. Note that the participant display may be displayed in a format of a name, a registered face, a color, or a combination of a plurality of these items, in addition to the symbols as illustrated in FIG. 5. Furthermore, the display format may be fixed, or may be set or switched by the user.

In addition, the participant displays "A" to "D" in this example indicate the current positions of participants "A" to "D". Besides, this example contains a conversation line linking the participant displays "B" and "C", and indicates that a conversation existed between the participants "B" and "C". Note that, in a case where the position of the corresponding participant display moves, the display position of the conversation line moves accordingly. The conversation line displayed on the planar map image in this manner may be deleted after being displayed for a certain period of time from the detection of the conversation.

Figure 6:
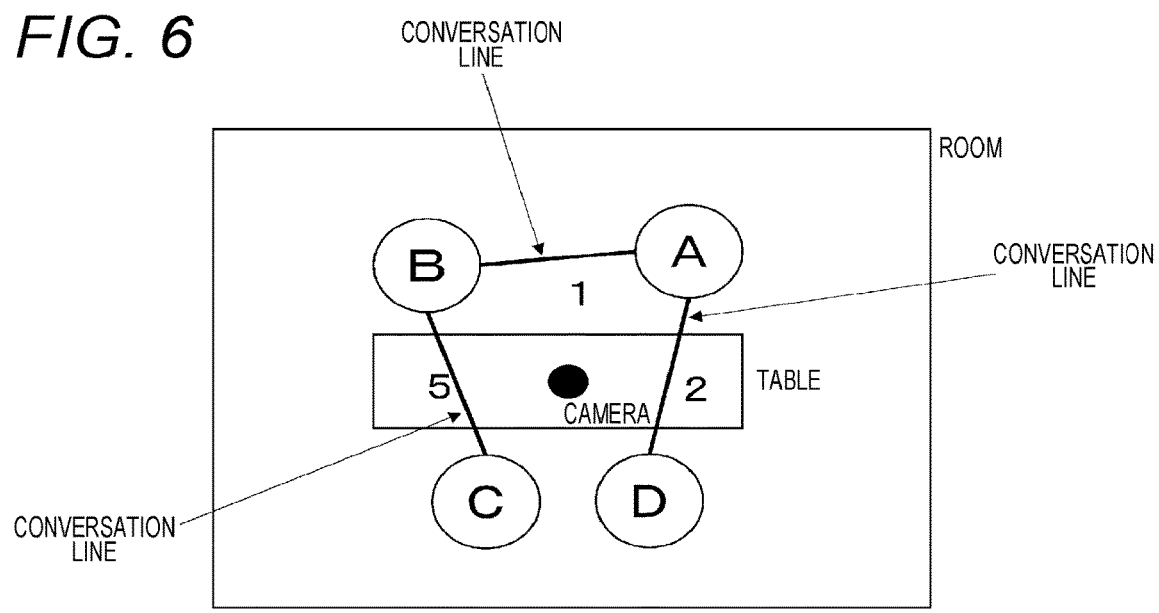
FIG. 6 is a diagram illustrating another example of the planar map image generated by the image generation unit.

FIG. 6 illustrates another example of the planar map image generated by the image generation unit 236. Also in this example, the circle displays labeled "A" to "D" indicate participant displays indicating participants participating in the conversation. This example contains respective conversation lines linking the participant displays "B" and "C", "A" and "B", and "A" and "D", and indicates that conversations existed between the respective participants.

In this case, the number of conversations is cumulated, and a character indicating the number of conversations is appended to each conversation line. Here, the count of the number of conversations between participants is incremented each time it is determined that a conversation exists between the participants as described above. In this example, it is indicated that there are five conversations between the participants "B" and "C", one conversation between the participants "A" and "B", and two conversations between participants "A" and "B". This cumulation of the number of conversations may involve the number of all conversations from the start of the conversations, or alternatively, the number of conversations that have taken place within a certain period of time in the past, for example, in the past five minutes, may be cumulated.

Figure 7:
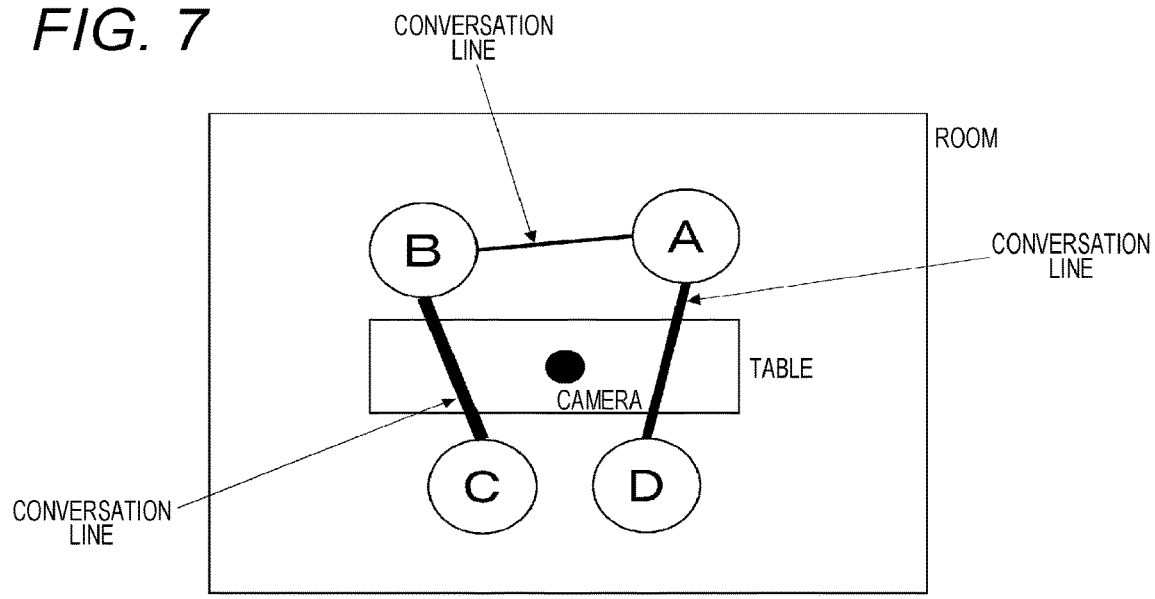
FIG. 7 is a diagram illustrating another example of the planar map image generated by the image generation unit.

Note that, instead of appending a character indicating the number of conversations to the conversation line, the number of conversations may be indirectly indicated by making the thickness of the conversation line according to the number of conversations, as illustrated in FIG. 7. Furthermore, it is also conceivable to use both of appending a character indicating the number of conversations to the conversation line and making the thickness of the conversation line according to the number of conversations.

Figure 8:
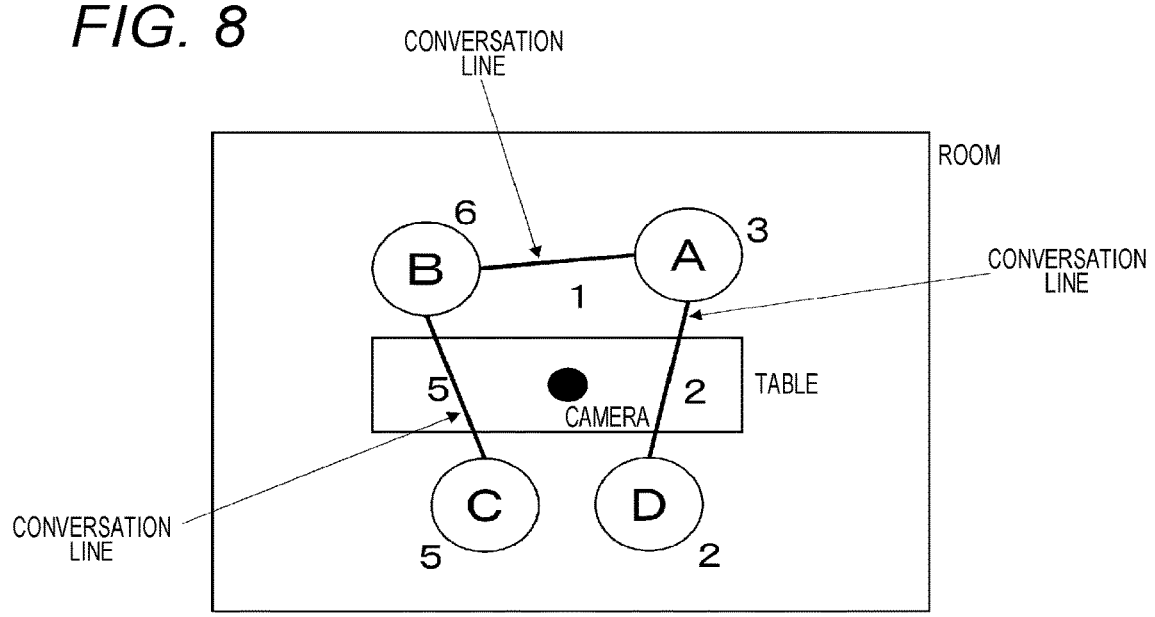
FIG. 8 is a diagram illustrating another example of the planar map image generated by the image generation unit.

FIG. 8 illustrates another example of the planar map image generated by the image generation unit 236. In this example, with respect to the example illustrated in FIG. 6, a character indicating the number of statements is further appended to the participant display corresponding to each participant. In this example, it is indicated that a participant "A" has three statements, a participant "B" has six statements, a participant "C" has five statements, and a participant "D" has two statements.

Figure 9:
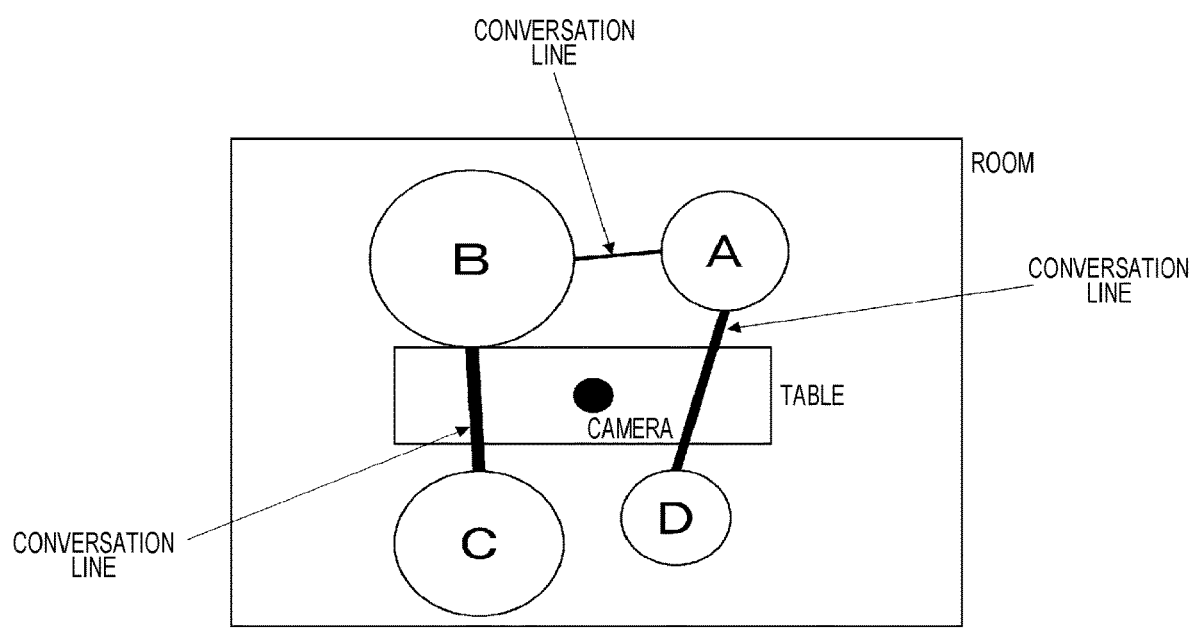
FIG. 9 is a diagram illustrating another example of the planar map image generated by the image generation unit.

Note that, instead of appending a character indicating the number of statements to the participant display, the number of statements may be indirectly indicated by making the dimensions (size) of the participant display according to the number of statements, as illustrated in FIG. 9. Furthermore, it is also conceivable to use both of appending a character indicating the number of statements to the participant display and making the dimensions of the participant display according to the number of statements. In addition, it is also conceivable to allow a character indicating the duration of statements to go along, rather than the number of statements, to the participant display.

Returning to FIG. 2, the image generation unit 236 supplies the generated planar map image to the monitor 204, and causes the monitor 204 to display the supplied planar map image. Furthermore, the image generation unit 236 supplies the generated planar map image to the server 205, and causes the server 205 to hold the supplied planar map image. In addition, the image generation unit 236 supplies the generated planar map image to the mobile terminal 206 through the communication unit 237 instead of the monitor 204 or together with the monitor 204 according to an operation of the user, and causes the mobile terminal 206 to display the supplied planar map image. Besides, the image generation unit 236 reproduces the planar map image from the server 205 according to an operation of the user to supply the planar map image to the monitor 204 or the mobile terminal 206, and causes the monitor 204 or the mobile terminal 206 to display the reproduced planar map image. Note that it is also conceivable to give an instruction to reproduce the planar map image from the server 205, from the mobile terminal 206 via the communication unit 237.

Figure 10:
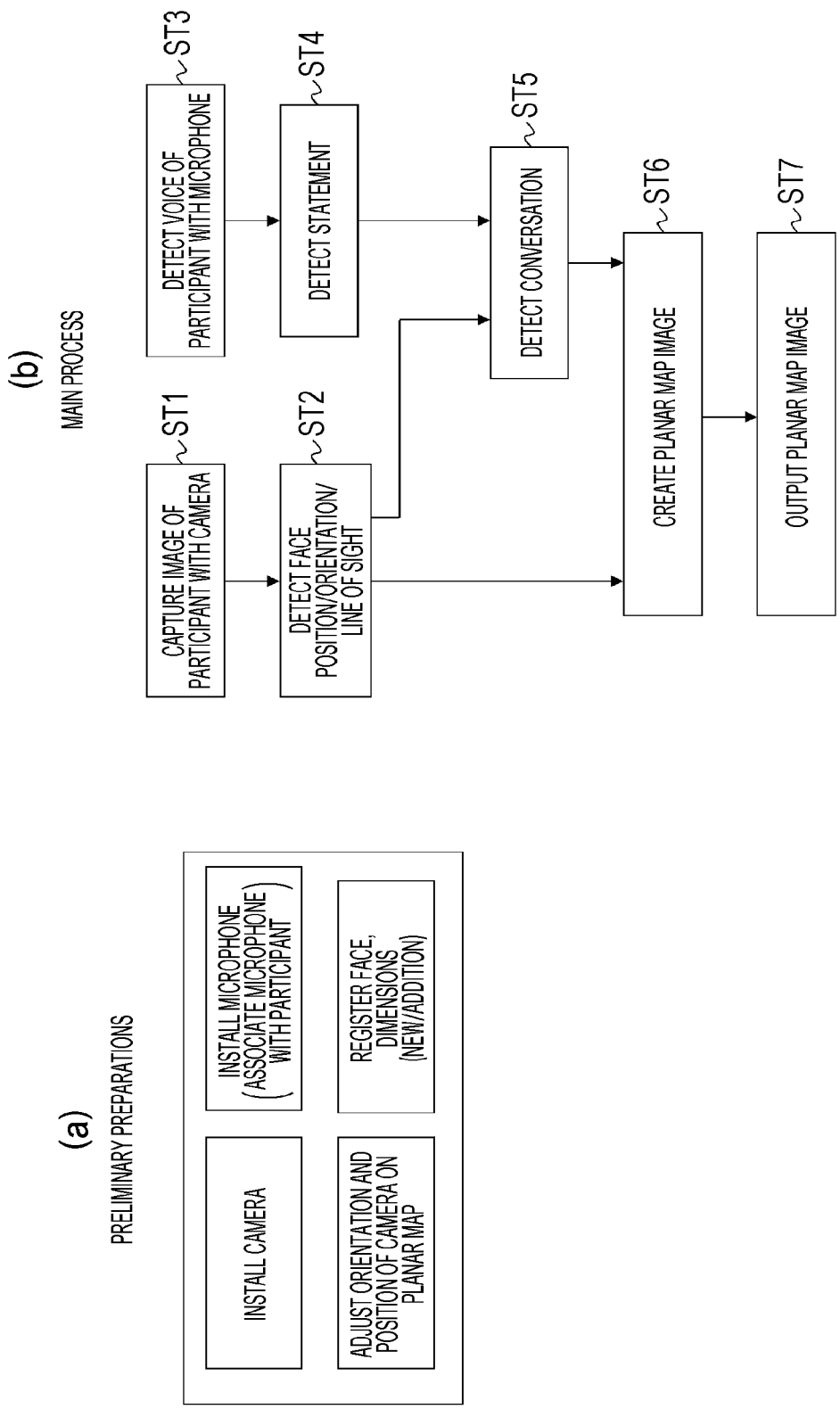
FIG. 10 is a diagram for explaining a flow of a process of the information processing device.

The flow of a process of the information processing device 200 illustrated in FIG. 2 will be described. First, as illustrated in FIG. 10(a), as advance preparations, the cameras 201-1 to 201-N are installed such that every person participating in the conversation, especially the face, is imaged. For example, a camera capable of imaging the entire surroundings, such as a 360-degree camera, is installed at the center of the participants, or alternatively, a plurality of cameras is installed such that the entire surroundings can be imaged. In this case, adjustment is made such that the orientation and position of the camera on the planar map are put in a constant state.

Furthermore, the microphones 202-1 to 202-M are installed as advance preparations. For example, the microphone is attached to every person participating in the conversation, or a microphone array is installed at the center of the participants. Here, in a case where the microphone is attached to every person participating in the conversation, the microphone is associated with the participant. In addition, the face of each participant is captured with a camera and registered as advance preparations. In this case, imaging is performed while a distance between the participant and the camera is kept constant, and the dimensions of the face are measured and held together with the face. Note that information on the distance in this case may be held together. Besides, in this case, when a participant is registered for the first time, new registration is performed; however, when there is a participant who has already been registered, it is sufficient to additionally register the remaining participants.

After the advance preparations are completed, a main process illustrated in FIG. 10(b) is repeatedly performed as a conversation proceeds. In step ST1, captured images including each participant participating in the conversation are obtained using the cameras 201-1 to 201-N. Then, in step ST2, the image processing unit 234 processes a captured image signal to specify the position and state of the face of each participant, for example, a direction in which each participant is looking (the orientation of the face or the line of sight).

Furthermore, in step ST3, the voice of each participant participating in a conversation is detected using the microphones 202-1 to 202-M. Next, in step ST4, the voice processing unit 233 processes the voice signal and detects a statement of each participant participating in a conversation.

Then, in step ST5, the determination unit 235 detects a conversation on the basis of all or some of statements of the participants obtained by the voice processing unit 233 and all or some of states of the participants obtained by the image processing unit 234. In this case, for example, it is determined that there is a conversation between a first participant and a second participant, when a statement of the second participant is made after the first participant has made a statement or immediately before the statement finishes, and a direction in which the second participant is looking coincides with the direction of the first participant. In addition, for example, it is determined that there is a conversation between the first participant and the second participant, when the second participant makes an utterance after the first participant makes a statement, or when the second participant's face moves up and down (nodding response) after the first participant makes a statement.

Next, in step ST6, the image generation unit 236 generates a planar map image of a space such as a room used for conversation. In this case, a participant display indicating each participant participating in a conversation detected by the image processing unit 234 is added to the planar map image, and the position of this participant display is dynamically altered according to the position of the relevant participant (face position) specified by the image processing unit 234. Furthermore, in this case, a conversation line connecting two corresponding participant displays is added to the planar map image on the basis of the conversation determination information from the determination unit 235, and additionally, displays of the number of statements of each participant, the number of conversations between two participants, and the like are also added.

Next, in step ST7, the image generation unit 236 outputs the created planar map image. In this case, the planar map image is supplied to the monitor 204, and the monitor 204 is caused to display the planar map image. In addition, in this case, the planar map image is supplied to the server 205, and the server 205 is caused to accumulate and hold the sequentially generated planar map images. Moreover, in this case, the planar map image is transmitted to the mobile terminal 206 through the communication unit 237, and this mobile terminal 206 is caused to display the planar map image.

As described above, in the information processing device 200 illustrated in FIG. 2, the determination unit 235 determines the state and existence of a conversation on the basis of a statement of each participant participating in the conversation and a state detected by an image process. For this reason, the state and existence of a conversation is allowed to be determined with higher accuracy than in a technology that determines the state and existence of a conversation only by statements of participants.

Furthermore, in the information processing device 200 illustrated in FIG. 2, the planar map image generated by the image generation unit 236 contains a participant display indicating each participant participating in a conversation, and this planar map image contains a conversation line connecting two corresponding participant displays on the basis of a detected conversation. Therefore, it is possible to visually recognize who had a conversation with whom, with ease.

In addition, in the information processing device 200 illustrated in FIG. 2, the image processing unit 234 processes the image signal to further detect the position of each participant participating in a conversation, and the image generation unit 236 alters the position of the participant display indicating each participant on the planar map image, according to this detected position of each participant. Therefore, it is possible to visually recognize at what position each participant participating in a conversation is located, with ease.

Besides, in the information processing device 200 illustrated in FIG. 2, the participant display contained in the planar map image generated by the image generation unit 236 has a size according to the number of statements of the corresponding participant, or the participant display is appended with a character indicating the number of statements of the corresponding participant. Therefore, it is possible to visually recognize what degree the number of statements of each participant has, with ease.

Furthermore, in the information processing device 200 illustrated in FIG. 2, the conversation line contained in the planar map image generated by the image generation unit 236 has a thickness according to the number of conversations between corresponding participants, or the conversation line is appended with a character indicating the number of conversations between corresponding participants. Therefore, it is possible to visually recognize what degree the number of conversations between every two participants has, with ease.

In addition, in the information processing device 200 illustrated in FIG. 2, the planar map image generated by the image generation unit 236 is supplied to the monitor 204 as a display unit, and the planar map image is displayed on this monitor 204. Therefore, for example, a facilitator of the conversation can check the monitor 204 for the planar map image having various types of information regarding statements and conversations.

Besides, in the information processing device 200 illustrated in FIG. 2, the planar map image generated by the image generation unit 236 is supplied to and held in the server 205. Therefore, the past planar map image can be reproduced from this server 205 and supplied to, for example, the monitor 204 to be displayed thereon, such that the past planar map image can be easily checked.

Furthermore, in the information processing device 200 illustrated in FIG. 2, the planar map image or the past planar map image read from the server 205 is supplied to the mobile terminal 206 through the communication unit 237 by the image generation unit 236 as necessary, and the current or past planar map image is displayed on this mobile terminal 206. Therefore, for example, a facilitator of the conversation can check the mobile terminal 206 for the planar map image having various types of information regarding statements and conversations.

3. Modifications

Note that, in the above-described embodiments, personal verification is performed by registering the face of the participant in advance and comparing the face detected from the image with the registered face. However, in this procedure, an appropriate display cannot be made in a case where an unregistered person participates. Thus, it is also conceivable that, in a case where the personal verification fails, a face that has failed in the personal verification is newly registered as a participant.

In this case, since the relationship between the dimensions of the face and the distance is not registered for the new participant, the precise distance cannot be known unless a means such as a stereo camera capable of measuring the distance is used. Thus, the distance to the new participant from the camera is fixed, or the distance to the camera is simply calculated using the average dimensions of the face.

Figure 11:
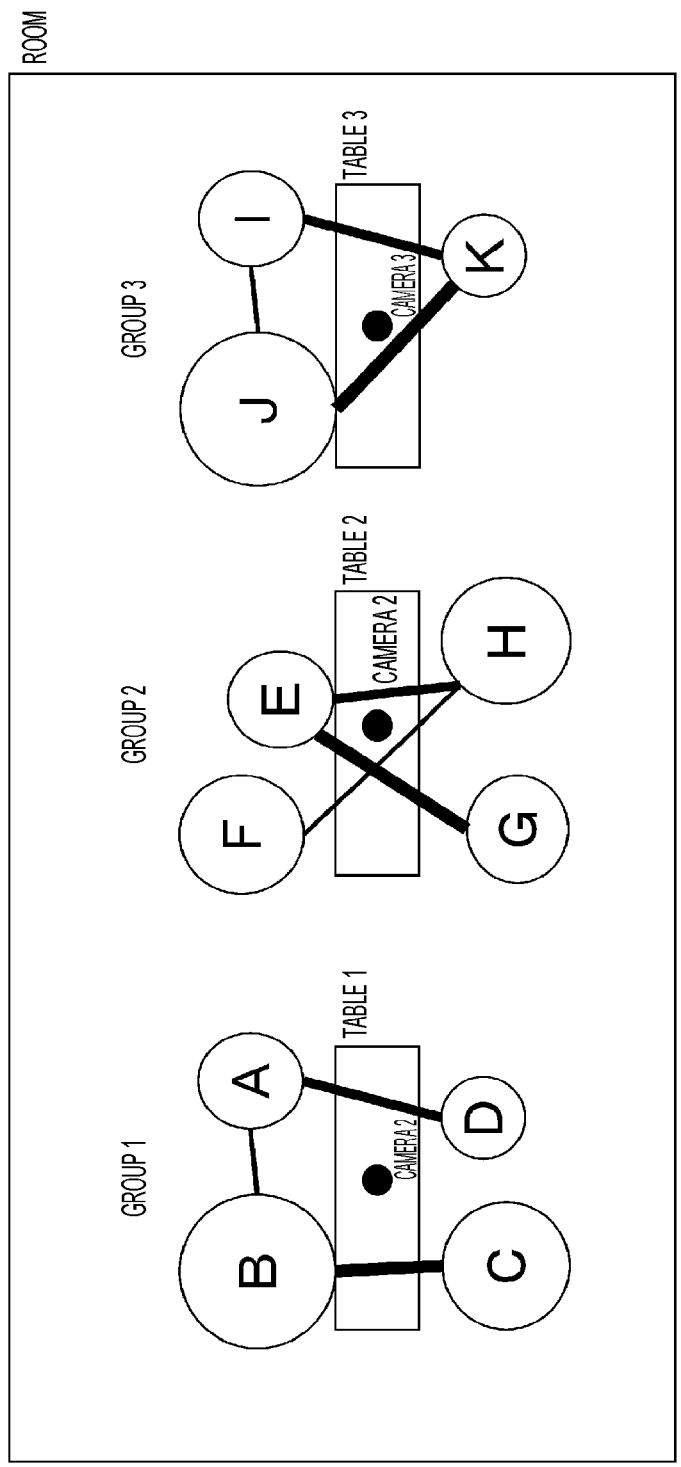
FIG. 11 is a diagram illustrating an example of a planar map image in a case where conversations take place in a plurality of divided groups in a large room (venue).

Furthermore, in the above-described embodiments, an example in which a conversation takes place in one group has been indicated; however, there is also a case where conversations take place in a plurality of divided groups in a large room (venue). In such a case, participants are sometimes exchanged between the groups. In that case, as illustrated in FIG. 11, cameras are arranged for each group, and a face appearing on a camera of a particular group is designated as a participant of the particular group. Note that, in this example in FIG. 11, group 1 is made up of four participants "A" to "D", group 2 is made up of four participants "E" to "H", and group 3 is made up of three participants "I" to "K".

Then, the position, the number of statements, and the number of conversations of the participant are displayed for each group. As for the determination as to whether or not the members of the group have been exchanged, an exchange may be determined at a moment when the face of a particular participant appears on a camera for imaging another group, or an exchange may be determined after a preset period of time has elapsed after the exchange. In this case, a time when the face first appears on the camera is also recorded such that the exchange is confirmed after a preset period of time has elapsed and then the number of conversations and the like are displayed.

Furthermore, in the above-described embodiments, a conversation that takes place in one room (space) has been described. However, there is also a case where a participant located in another room participates in one conversation by a video conference, a telephone conference, a web conference, or the like. In such a case, as in FIG. 12, planar maps of a plurality of spaces where participants are present are all prepared, and the positions of all the participants are displayed. In this example illustrated in FIG. 12, four participants "A" to "D" are present in room 1 and two participants "F" and "G" are present in room 2.

Figure 12:
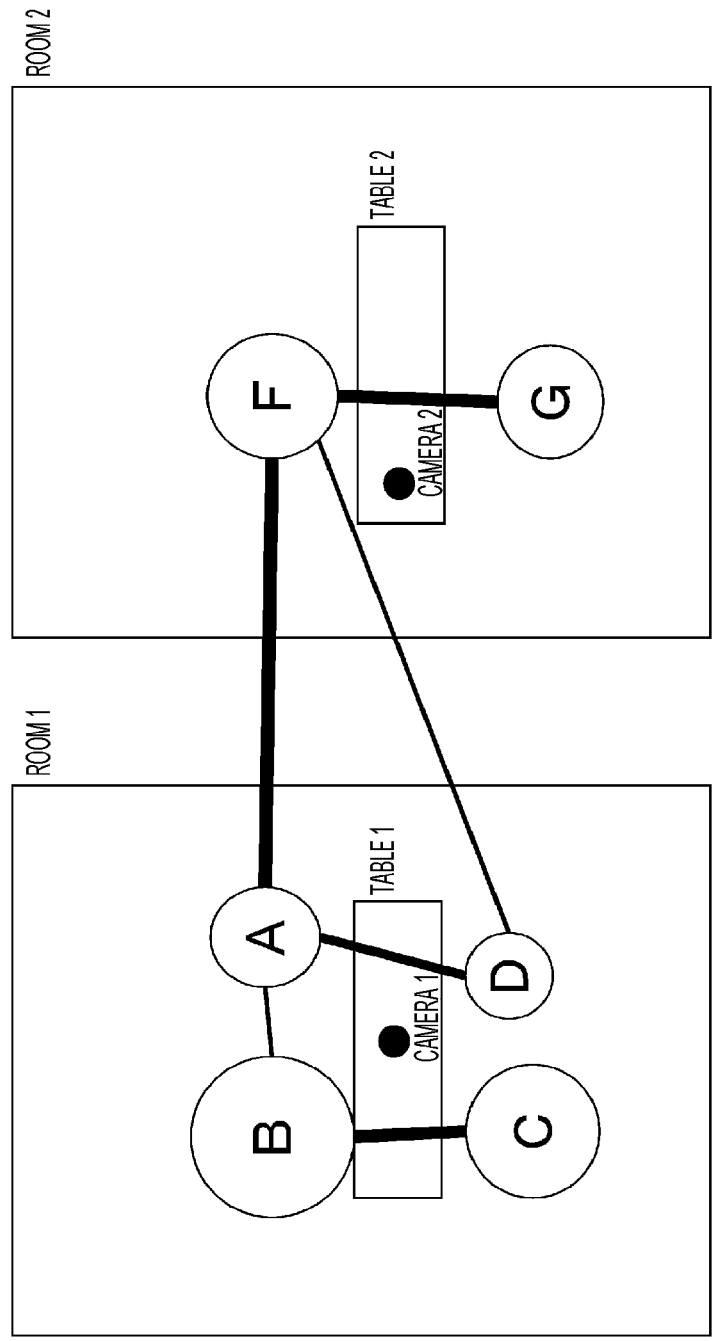
FIG. 12 is a diagram illustrating an example of a planar map image in a case where participants located in another room participate in one conversation.

The conversation lines are displayed similarly as described above with regard to conversations between participants in the same space, but the conversation lines with regard to conversations between participants located in different spaces are displayed across the planar maps. Note that, although the example in FIG. 12 illustrates an example of two rooms, this similarly applies to a case of three or more rooms. In addition, the establishment of a conversation between participants located in different rooms can be determined depending on whether or not the participants are looking at monitors with each other.

Figure 13:
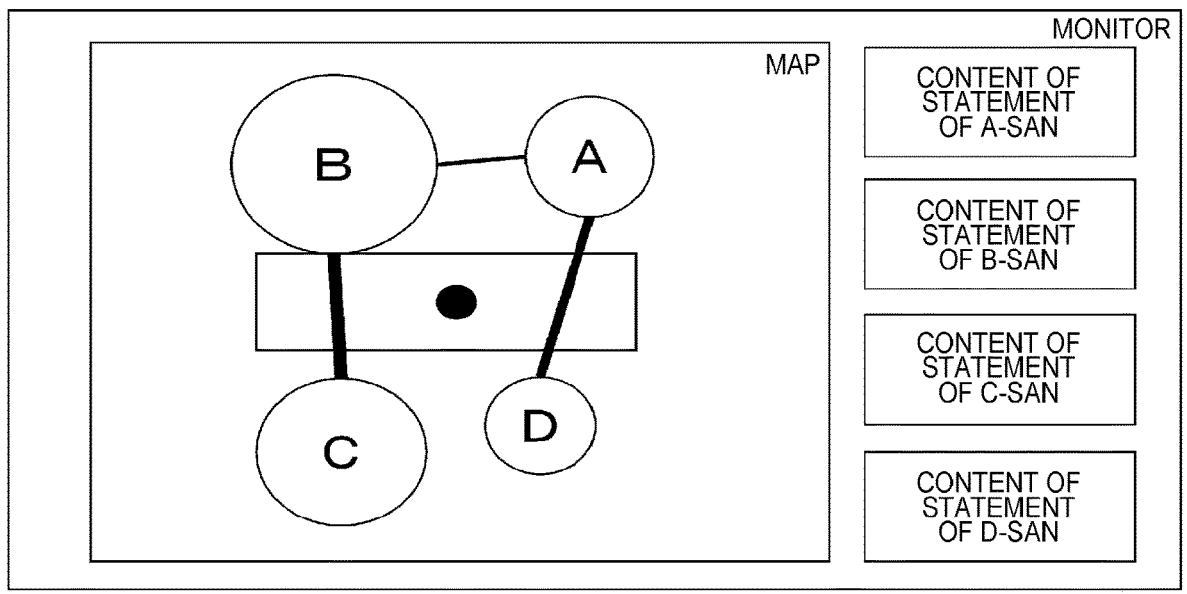
FIG. 13 is a diagram illustrating an example of a planar map image in a case where information other than a participant display, the number of statements, and the number of conversations is displayed on a planar map or an area outside the map.

Furthermore, in the above-described embodiments, the position, the number of statements, and the number of conversations of the participant of a conversation are displayed on the planar map; however, information other than the participant display, the number of statements, and the number of conversations may be displayed on the planar map and an area outside the map as illustrated in FIG. 13. For example, as illustrated in FIG. 13, the content of a statement may be translated into a sentence from the acquired voice by voice recognition and displayed. In this case, as the content of a statement, it is conceivable to extract and display only a keyword, or to display the entire sentence of the content of the statement, for example.

Figure 14:
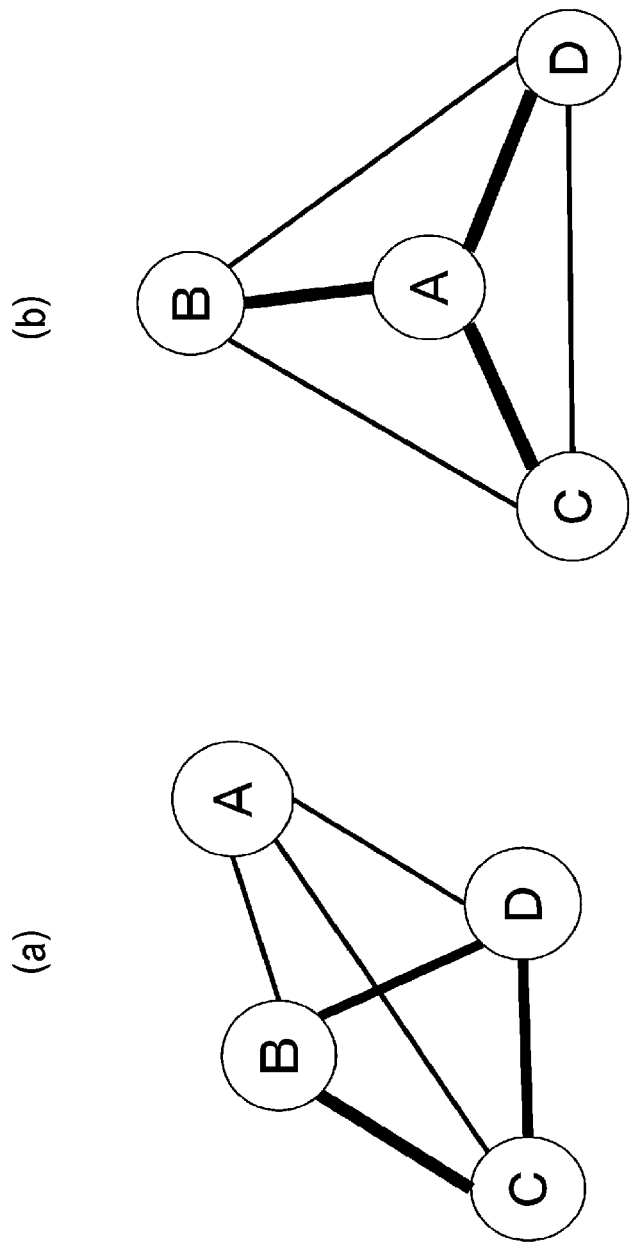
FIG. 14 is a diagram for explaining an example in which the position of the participant display indicating each participant is specified according to the number of conversations of each participant.

In addition, in the above-described embodiments, the participant of a conversation is displayed at a position on the planar map observed on a camera image of the participant. However, as illustrated in FIGS. 14(a) and 14(b), the position of the participant display indicating each participant may be specified according to the number of conversations of each participant. For example, a person having a larger total number of conversations is arranged closer to the center of the screen, and a person having a smaller total number of conversations is arranged on an outer side of the screen. Besides, in a case where the number of conversations between two participants is larger, the two participants are arranged nearer to each other, and in a case where the number of conversations between two participants is smaller, the two participants are arranged farther from each other.

As an arrangement method, for example, an equation of Coulomb's law in magnetic force is used. A Coulomb force F is indicated by following formula (1). Here, k denotes a proportionality constant, m1 and m2 denote magnetic quantities of objects 1 and 2, respectively, and r denotes a distance between the two objects.

$$F = km1m2/r^2 \quad (1)$$

First, a virtual object 0 is arranged as a magnetic quantity m0 at the center of the planar map, and in a case where there are four participants, magnetic quantities m1 to m4 proportional to the number of conversations are given to objects 1 to 4, respectively. As the number of conversations increases, the magnetic quantity grows larger. The magnetic quantities m0 and m1 to m4 attract each other by the Coulomb force computed by formula (1). On the other hand, although m1 to m4 repel each other, the repulsive force decreases as the number of conversations increases with each other, and thus the magnetic quantity according to the number of conversations is transformed into a reciprocal, such as m1'=1/m1. By substituting m1' for m1 in formula (1), the computed Coulomb forces repel each other with a force inversely proportional to the number of conversations.

With the attractive force with respect to m0, the positions of all participants try to approach the center. On the other hand, the positions of all participants repel each other with a force inversely proportional to the number of conversations, and accordingly try to part away from each other. The position of the participant stops and is specified in a state in which the balance between the attractive and repulsive forces are maintained. When the number of conversations varies, the display position of the participant on the planar map also varies.

Consequently, the position of the participant display is arranged closer to the center of the planar map picture as the number of conversations increases, such that it is possible to visually recognize who has a larger number of conversations, with ease. Furthermore, since the participant displays of two participants are made nearer to each other as the number of conversations between the two participants increases, it is possible to visually recognize who has a larger number of conversations with whom, with ease. For example, FIG. 14(a) illustrates a state in which the number of conversations of a participant "A" is smaller and the remaining three persons each have a larger number of conversations, and it is possible to visually recognize that such a state has been brought about, from this figure with ease. Meanwhile, FIG. 14(b) illustrates a state in which the number of conversations of a participant "A" is larger and the participant "A" acts as a kind of hub of conversations, and it is possible to visually recognize that such a state has been brought about, from this figure with ease.

Note that, even in a case where the position of the participant display indicating each participant is specified according to the number of conversations of each participant in this manner, a character indicating the number of conversations can be appended to the conversation line, or the thickness of the conversation line can be made according to the number of conversations, and furthermore, a character indicating the number of statements of each participant can be appended to each participant display, or the size of each participant display can be shaped into a size according to the number of statements or the duration of statements of each participant (refer to FIGS. 6 to 9).

Figure 15:
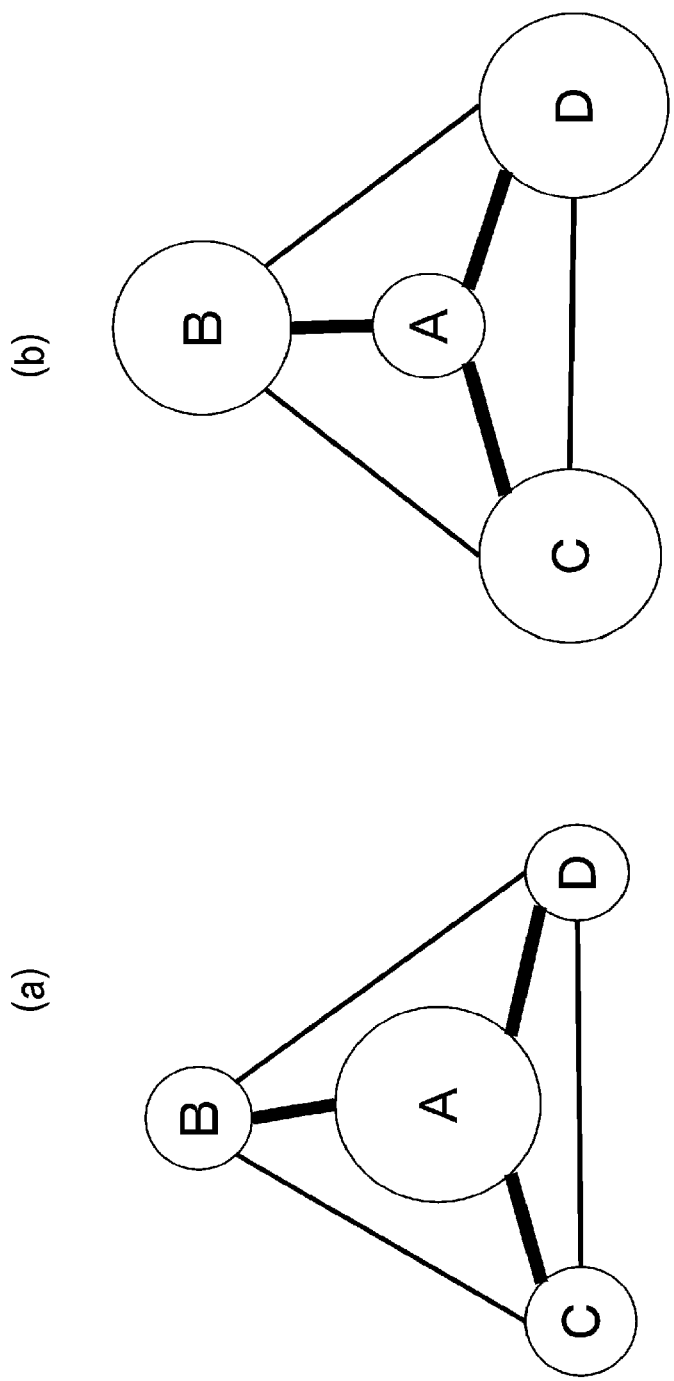
FIG. 15 is a diagram for explaining a case where the size of the participant display of each participant is changed in accordance with the duration of statements.

For example, FIGS. 15(a) and 15(b) illustrate cases where the size of the participant display of each participant is changed in accordance with the duration of statements with respect to FIG. 14(b). In the case of FIG. 15(a), it is possible to see a scene in which the participant "A" has a long duration of statements, and just keeps making statements like a solo performance, for example. Meanwhile, in the case of FIG. 15(b), it is possible to see a scene in which the participant "A" has many conversations but does not have a long duration of statements so much, that is, the participant "A" acts as a kind of moderator or facilitator of the conversation group.

In this manner, by arranging the participant display indicating each participant at a position according to the number of conversations, the state of a conversation can be objectively grasped. A viewer such as a facilitator may be allowed to switch between a plurality of display methods for planar maps, such as a planar map based on a position observed by a camera and a planar map based on a position according to the number of conversations.

Figure 16:
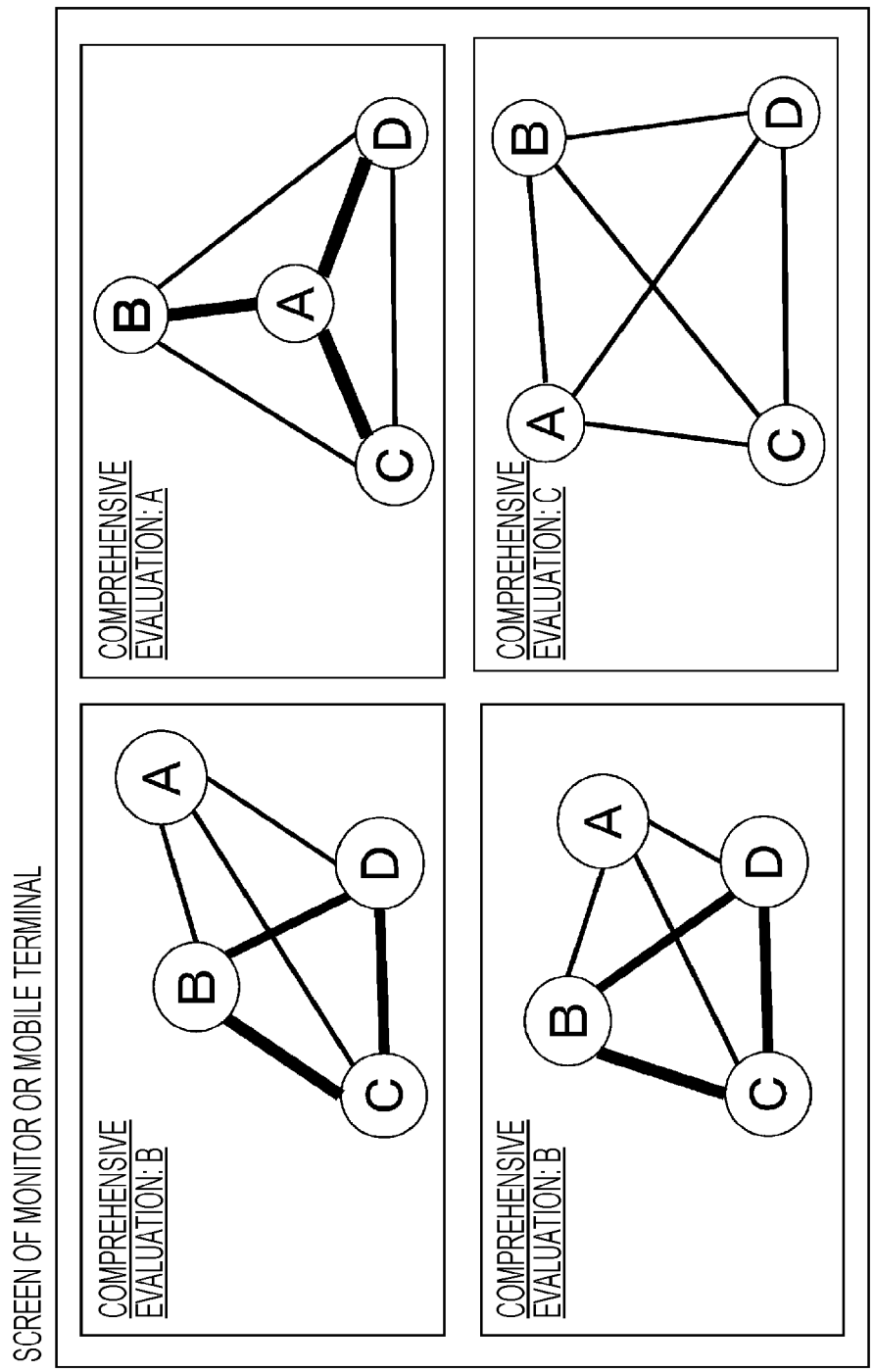
FIG. 16 is a diagram for explaining that evaluation is performed according to a statement of a participant and the situation of a conversation, and an evaluation value of the evaluation is displayed.

Furthermore, although not described above, a description will be given of a means of performing an evaluation and displaying an evaluation value of the evaluation according to a statement of the participant or the situation of a conversation. For example, as illustrated in FIG. 16, an evaluation rank of a conversation in each conversation group is displayed for each conversation group. In FIG. 16, the evaluation rank is displayed in three stages of A, B, and C from the top rank. For example, a group displayed in the upper right is evaluated as "comprehensive evaluation A".

Figure 17:
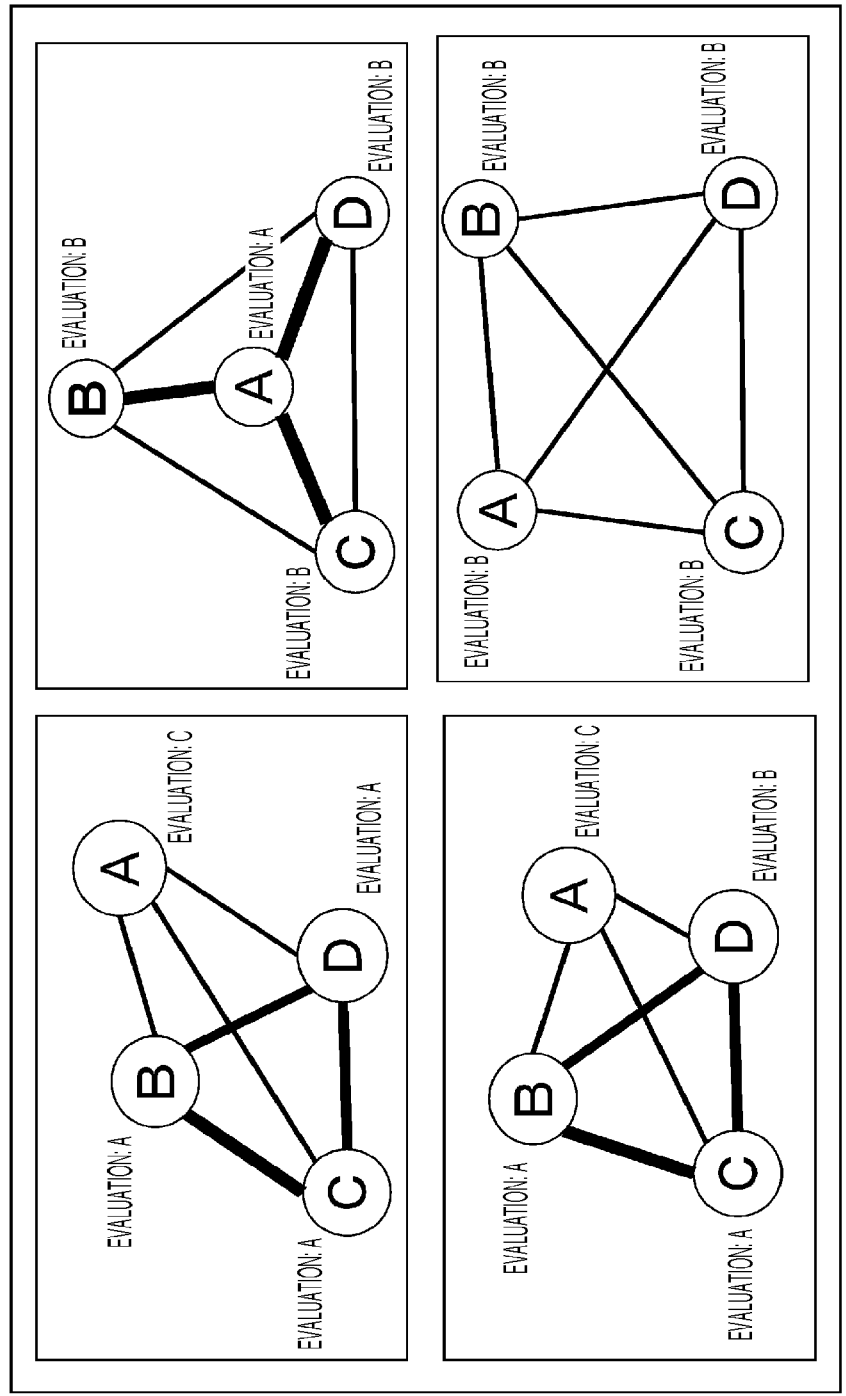
FIG. 17 is a diagram for explaining that an evaluation rank of each participant is displayed.

In this manner, when the evaluation rank is displayed for each group, it becomes easy for a facilitator to know which group's conversation should be supported. Moreover, by displaying the evaluation rank of each participant as illustrated in FIG. 17, it is possible to know which participant has hesitated to participate in conversations.

As for the evaluation for each group, the evaluation is performed in accordance with, for example, the number of statements and the number of conversations. For example, an evaluation value Et of each group is worked out using following formula (2). Here, Ngs denotes the number of statements, Ngc denotes the number of conversations, and $\alpha g$ and $\beta g$ denote coefficients. The evaluation rank is worked out by processing the evaluation value computed by formula (2) with a threshold value defined in advance. Note that the evaluation value may be displayed as it is without being converted into the evaluation rank.

$$Et = \alpha g \cdot Ngs + \beta g \cdot Ngc \tag{2}$$

Furthermore, an evaluation value Em of each participant is likewise worked out from the number of statements and the number of conversations using following formula (3). Here, Nms denotes the number of statements, Nmc denotes the number of conversations, and $\alpha m$ and $\beta m$ denote coefficients. The evaluation rank is worked out by processing the evaluation value computed by formula (3) with a threshold value defined in advance. Note that the evaluation value may be displayed as it is without being converted into the evaluation rank.

$$Em = \alpha m \cdot Nms + \beta m \cdot Nmc \tag{3}$$

In addition, as for the evaluation value of the group, since lower evaluation is given if only some people are excited, the evaluation value of each participant may be added to the evaluation. For example, an evaluation value Et' of each group is worked out on the basis of following formula (4). Here, min(Em) represents the lowest evaluation value among all participants participating in the concerned conversation group, and $\gamma g$ denotes a coefficient. With this configuration, when there is a participant with a low evaluation value, the evaluation of the entire group is lowered.

$$Et' = \alpha g \cdot Ngs + \beta g \cdot Ngc + \gamma g \cdot \min(Em) \tag{4}$$

Note that, although the number of statements is used in formulas (2) to (4), the number of statements may be replaced with the duration of statements, or both of the number of statements and the duration of statements may be used.

In addition, in the above, an example in which the participant participating in a conversation and the conversation group are evaluated has been indicated; however, it is also conceivable to evaluate the content that has influenced the conclusion of the conversation, together with or separately from the above-described evaluation.

Furthermore, in the above, an example in which the monitor 204 and the mobile terminal 206 display the evaluation values of the participant participating in a conversation and the conversation group has been indicated; however, in a case where a teacher monitors a plurality of conversation groups of students, it is conceivable to present the following information to the teacher or the students.

As information to be presented to the teacher, information for suggesting an intervention to the teacher is conceivable.

In this case, what state each group is in is visualized. In addition, in this case, priorities are assigned such that a group whose visualization is most required among the multiple groups is known. For example, the priority of a group including a student who does not make any statement at all is made higher. The teacher can put priority on visualizing the state of this group with a higher priority to understand what state this group is in.

Besides, as information to be presented to the teacher, information on a score or a grade automatically assigned to each student or each group is conceivable. This score or grade is displayed as appropriate according to an operation of the teacher, for example, as a cumulative or instantaneous score or grade.

Meanwhile, as information to be presented to the students, information to assist the students is conceivable. For example, a summary of conversations until the current time is displayed in order to prompt a student to participate in the next conversation. Furthermore, as information to be presented to the students, information for warning the students is conceivable. For example, the number of times of statements and the amount of statements contributing to the overall flow are displayed.

In addition, in the above-described embodiments, an example in which information on a statement, a conversation, and the like is utilized as information for examining the situation of the conversation has been indicated; however, it is also conceivable to also utilize information on utterances relating to consent, denial, a nodding response, and the like as information for examining the situation of the conversation. For example, the number of occurrences relating to consent, denial, a nodding response, and the like may also be counted such that the counted number of utterances is displayed on the planar map image together with the number of conversations and the number of statements.

Besides, in the above-described embodiments, an example in which the microphone and the camera are configured as distinct bodies has been indicated; however, it is also conceivable that these microphone and camera are integrated. For example, conceivable examples include an example in which a microphone is integrated with a 360-degree camera, an example in which a microphone is integrated with each of a plurality of cameras that cover the entire surroundings, or the like.

Furthermore, in the above-described embodiments, a direction in which the participant is looking has been indicated as the state of the participant detected by processing the image signal; however, the state of the participant to be detected is not limited to this case. For example, as the state of the participant, the participant's facial expression (joy, anger, sorrow, pleasure, surprise, and the like), gesture (finger, hand, and arm motions), face motion (a nod in an up-down direction (consent, a nodding response), a head shake in a right-left direction (denial)), biometric information (change in body temperature and change in pulse), and the like may be detected. In addition, for example, a person who nods a lot is highly likely to be positively participating in the conversation even though the person does not make a statement during the conversation; thus, such information may be counted and displayed together with the number of conversations and the number of statements.

Besides, in the above-described embodiments, an example in which a statement of the participant of the conversation is detected from the voice signal, and the state of the participant of the conversation is detected from the image signal has been indicated; however, it is also conceivable to detect both of a statement of the participant and the state of the participant from the image signal.

Figure 18:
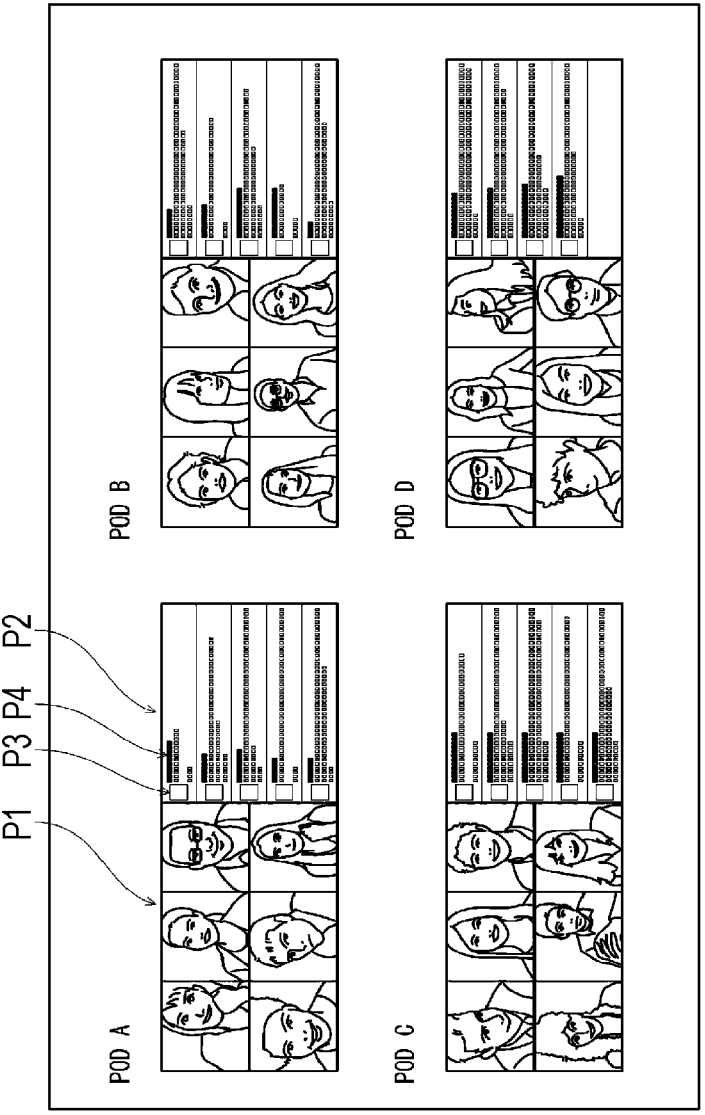
FIG. 18 is a diagram illustrating a screen display example on a monitor or a mobile terminal.

Furthermore, FIGS. 18 to 23 illustrate screen display examples on the monitor 204 or the mobile terminal 206. The screen display example in FIG. 18 illustrates the states of conversations in pods (conversation groups) A to D. Pod identifiers of POD A to POD D are displayed in correspondence to the displays of the respective pods. In addition, in each pod display, participants are indicated by images including the faces, as indicated by an arrow P1.

Besides, in each pod display, the timeline of a discussion is displayed in an area indicated by an arrow P2. In this case, a thumbnail image is arranged at the head of each statement as indicated by an arrow P3, and moreover, name characters are also arranged as indicated by an arrow P4 such that it can be known who has made the statement. Note that either one of the thumbnail image and the name characters may be employed. The display in this area in which the timeline of a discussion is displayed is automatically updated every time a statement is made such that a new statement is displayed at a latest position; however, the user can check past statements by performing a scroll operation on the screen.

Figure 19:
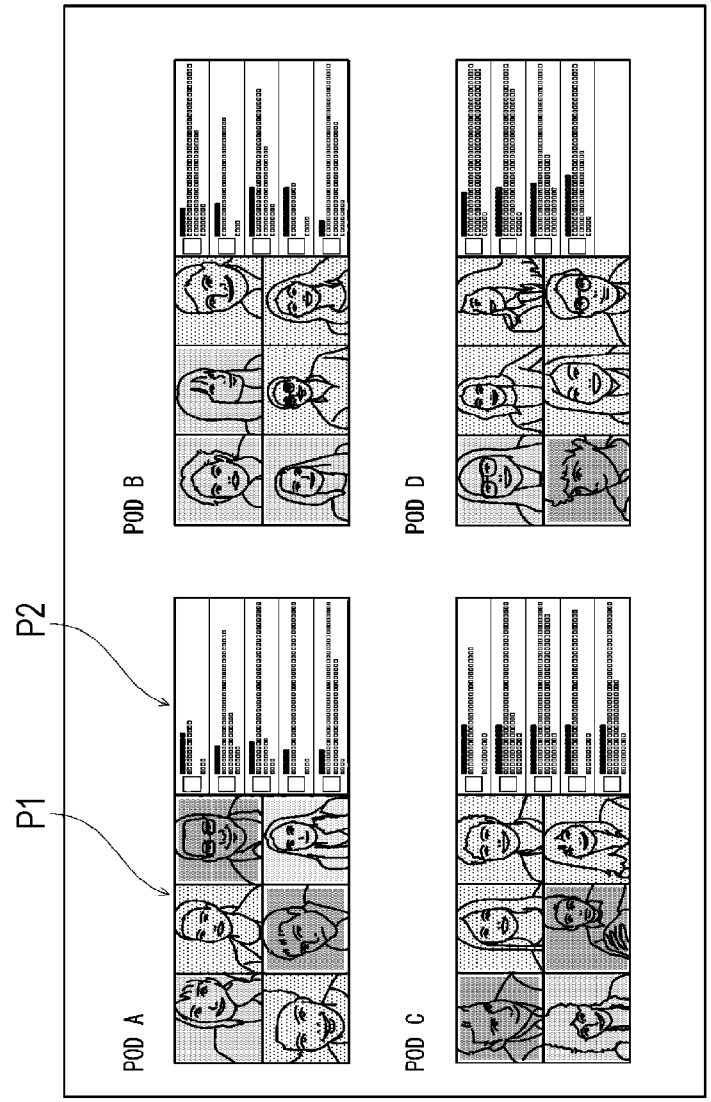
FIG. 19 is a diagram illustrating a screen display example on a monitor or a mobile terminal.

The screen display example in FIG. 19 illustrates the states of conversations in pods (conversation groups) A to D, similarly to the display example in FIG. 18. Pod identifiers of POD A to POD D are displayed in correspondence to the displays of the respective pods. In addition, in each pod display, participants are indicated by images including the faces, as indicated by an arrow P1. Besides, in each pod display, the timeline of a discussion is displayed in an area indicated by an arrow P2.

In this example, additionally, in the participant display indicated by the arrow P1, the color of the image of each participant dynamically changes according to the number of statements. For example, a participant with a larger number of statements is colored in yellow, a participant with a moderate number of statements is colored in red, a participant with a smaller number of statements is colored in green, and so forth. Note that, in the illustrated example, color variations are represented by variations of patterns superimposed on the images. Of course, the pattern superimposed on the image of each participant may be dynamically changed according to the number of statements. Furthermore, not only the number of statements but also the number of utterances by consent or nodding and the number of conversations can be similarly expressed by colors and patterns. With this configuration, for example, the teacher, who is a user, can visually check the number of statements and the like of each of the participants in each pod, with ease, and is allowed to easily intervene in a pod in which the teacher has felt a deadlock in discussion.

Figure 20:
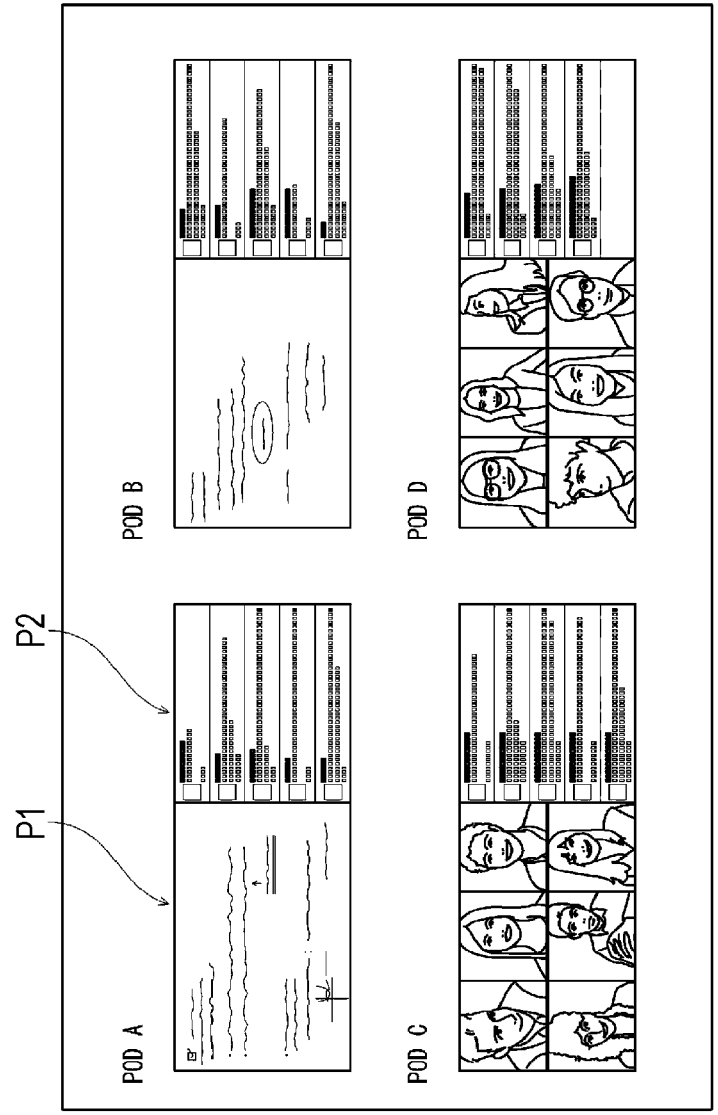
FIG. 20 is a diagram illustrating a screen display example on a monitor or a mobile terminal.

The screen display example in FIG. 20 illustrates the states of conversations in pods (conversation groups) A to D, similarly to the display example in FIG. 18. Pod identifiers of POD A to POD D are displayed in correspondence to the displays of the respective pods. Besides, in each pod display, the timeline of a discussion is displayed in an area indicated by an arrow P2. Furthermore, in this example, an area indicated by an arrow P1 can be switched to a shared screen in the pod, in addition to a state used for the participant displays with the face images and the like. In the illustrated example, switching to the shared screen has been performed in the pods A and B. For example, the teacher, who is a user, can make such an operation to switch screens as described above, and understand what material or description is used as a basis for the discussion being performed in each pod.

Note that, in each pod display, a statement of the conversation participant displayed in an area indicated by the arrow P2 is accumulated in the server 205, and for example, the timeline is sent to the mobile terminal 206 of each student in the form of minutes at the end of the lesson. When a student taps on a statement in the timeline, the saved video (camera image) can also be reviewed from the time of the tapped statement. In this case, the time point of each statement is held in association with the time axis of the camera image.

Figure 21:
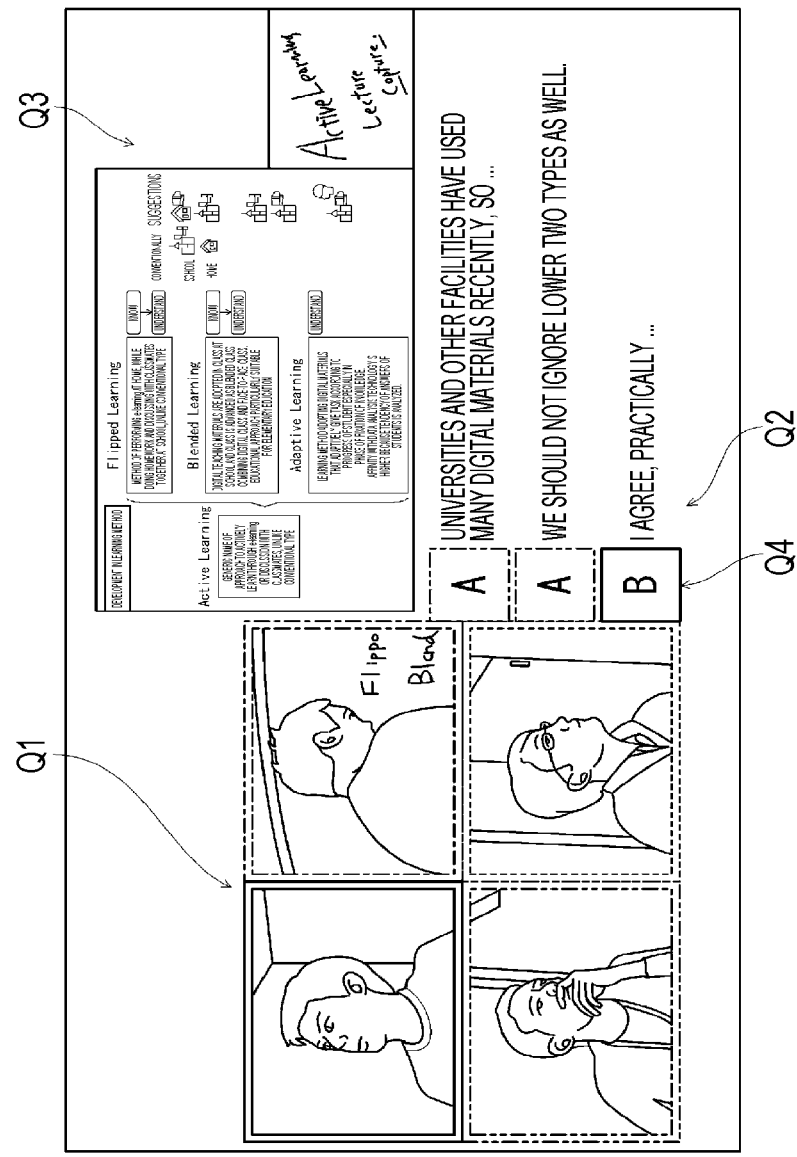
FIG. 21 is a diagram illustrating a screen display example on a monitor or a mobile terminal.

The screen display example in FIG. 21 illustrates the state of a conversation between four participants. In an area indicated by an arrow Q1, the participants are indicated by images including the faces. Furthermore, the timeline of a discussion is displayed in an area indicated by an arrow Q2. In this case, name characters are arranged at the head of each statement as indicated by an arrow Q4 such that it can be known who has made the statement. A thumbnail image may be employed instead of the name characters. In addition, in an area indicated by an arrow Q3, slides and writings on the board used in the discussion are displayed. Note that, in the illustrated example, among the four participants, a participant corresponding to an image displayed in the upper right of an area indicated by the arrow Q1 is facing backward because this participant is writing on the board at this point in time; accordingly, the face image cannot be taken, and person tracing is performed such that the image is cropped. Note that it is also conceivable to make the participant in correspondence to the statement by employing the same color between the color of a frame enclosing the image of each participant and the color of the character part of the name at the head of each statement. In the illustrated example, the line type is varied instead of the frame color to indicate the correspondence.

Figure 22:
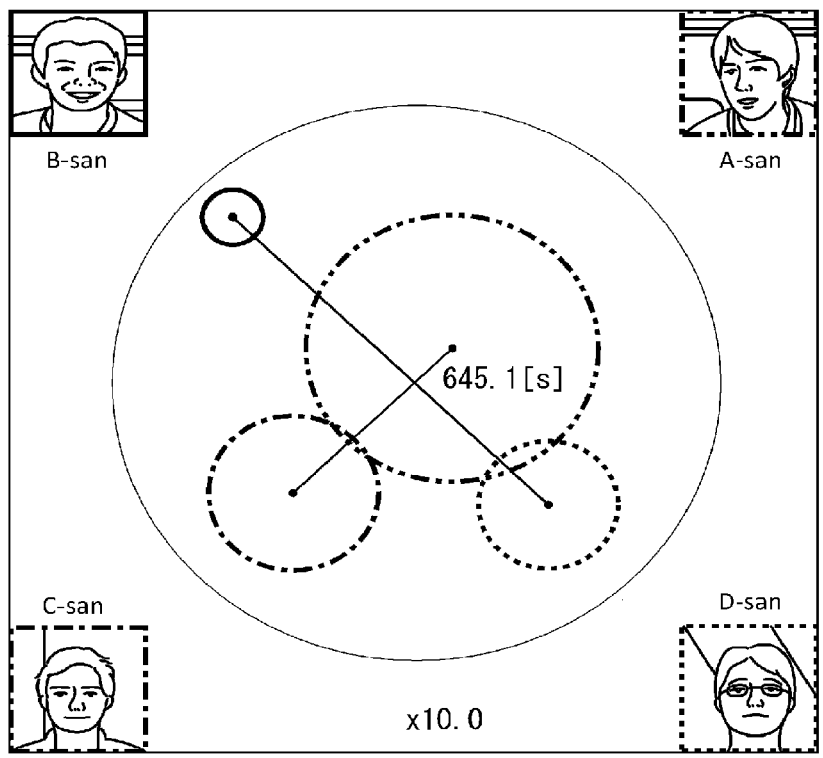
FIG. 22 is a diagram illustrating a screen display example on a monitor or a mobile terminal.

The image display example in FIG. 22 illustrates the state of a conversation between four participants. The face images of the four participants are displayed at the four corners of a rectangular frame. In this case, circles corresponding to the respective participants are displayed, and these circles move on diagonal lines. Note that, in order to make it easy to know the correspondence between the participant and the circle, the same color is employed between the color of the circle and the color of the frame of the image of the participant corresponding to the circle. In the illustrated example, the line type is varied instead of the frame color to indicate the correspondence. The circle of each participant is expanded as the number of statements increases, and furthermore, a distance from the center of the rectangular frame to the center of the circle is shortened as the number of conversations increases. In the illustrated example, it can be known that a participant displayed in the upper right image has a larger number of statements and a larger number of conversations as well, while a participant displayed in the upper left image has a smaller number of statements and a smaller number of conversations as well.

Figure 23:
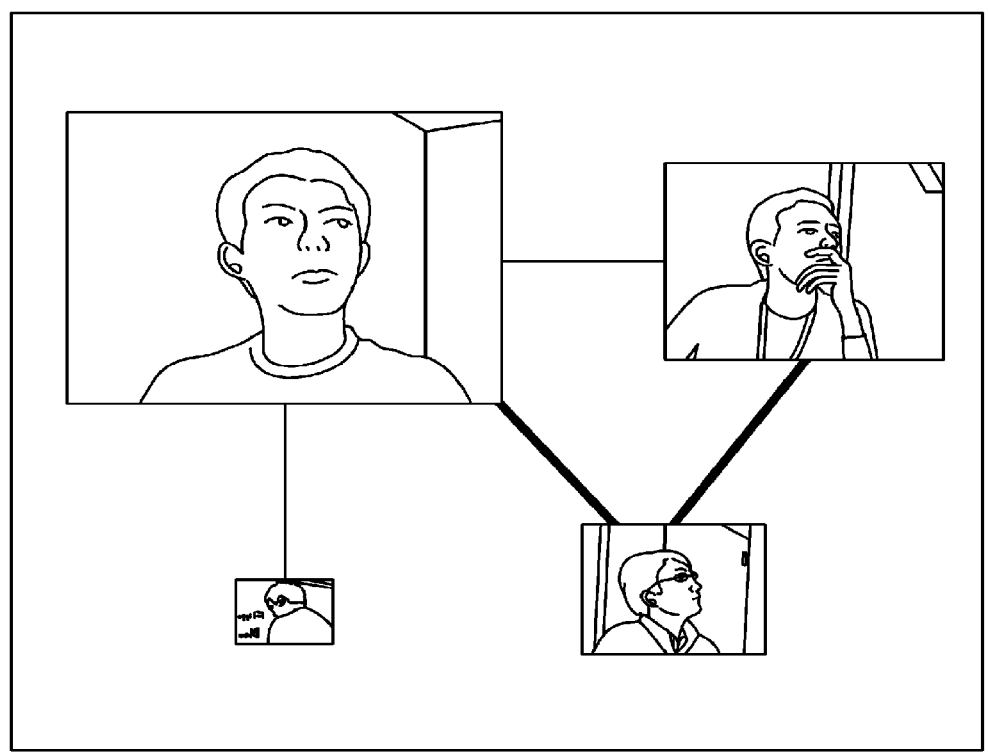
FIG. 23 is a diagram illustrating a screen display example on a monitor or a mobile terminal.

The image display example in FIG. 23 illustrates the state of a conversation between four participants. Face images indicating the four participants are displayed. In this case, the face image of a participant with a larger number of statements is displayed larger. Furthermore, conversation lines linking the participants are displayed, and displayed thicker as the number of conversations increases. In the illustrated example, it can be known that a participant indicated in the upper left image has a larger number of statements, and especially has a larger number of conversations with a participant indicated in the lower right image. In addition, it can be known that a participant indicated in the upper right image has a moderate number of statements, but especially has a larger number of conversations with the participant indicated in the lower right image, while having no conversation with a participant indicated in the lower left image.

Furthermore, the present technology can be also configured as described below.

(1) An information processing device including:

a voice processing unit that detects, from a voice signal, statements of a plurality of participants of a conversation;

an image processing unit that detects, from an image signal, states of the plurality of participants of the conversation; and a determination unit that determines a state of the conversation on the basis of the statements of the plurality of participants and the states of the plurality of participants.

(2) The information processing device according to (1) above, in which the state of the conversation includes a conversational relationship between the participants of the conversation.

(3) The information processing device according to (1) above, in which the state of the conversation includes at least one of content of the statements, a number of times of the statements, or a duration of the statements.

(4) The information processing device according to (1) above, in which the state of the conversation includes establishment of the conversation.

(5) The information processing device according to (4) above, in which the determination unit determines that the conversation has been established, when one of the participants is talking while looking at another party of the conversation.

(6) The information processing device according to any one of (1) to (5) above, in which the image processing unit detects a direction in which one of the participants is looking, as one of the states of the participants.

(7) The information processing device according to (6) above, in which the image processing unit detects a direction in which the one of the participants is looking, from an orientation of a face or a direction of a line of sight of the one of the participants.

(8) The information processing device according to (6) or (7) above, in which the determination unit determines that there is a conversation between a first participant and a second participant, when a statement of the second participant is made after the first participant has made a statement, and a direction in which the second participant is looking coincides with a direction of the first participant.

(9) The information processing device according to any one of (1) to (8) above, in which the voice processing unit measures a sound volume from the voice signal, and determines that a statement is made, in a case where a state with a measured sound volume equal to or higher than a threshold value continues for a certain period of time or longer.

(10) The information processing device according to (9) above, in which the voice processing unit determines that an utterance relating to consent, denial, or a nodding response is made, in a case where a state with a measured sound volume equal to or higher than the threshold value is kept for less than the certain period of time.

(11) The information processing device according to any one of (1) to (10) above, further including
an image generation unit that generates a planar map image of a space used for the conversation, in which
the planar map image contains a participant display indicating each of the participants participating in the conversation, and
the planar map image contains a conversation line connecting two corresponding participant displays on the basis of the conversation that has been detected.

(12) The information processing device according to (11) above, in which
the image processing unit processes the image signal to further detect a position of each of the participants participating in the conversation, and
the image generation unit alters a position of the participant display indicating the each of the participants on the planar map image, according to the detected position of the each of the participants.

(13) The information processing device according to (11) above, in which
the image generation unit alters a position of the participant display indicating the each of the participants on the planar map image, according to a number of conversations of the each of the participants.

(14) The information processing device according to (13) above, in which
the image generation unit arranges a position of the participant display indicating the each of the participants closer to a center of the planar map image as a number of conversations increases.

(15) The information processing device according to (13) or (14) above, in which
the image generation unit makes an interval between participant displays of two participants shorter as a number of conversations between the two participants increases.

(16) The information processing device according to any one of (11) to (15) above, in which
the participant display has a size according to a number of statements of a corresponding participant.

(17) The information processing device according to any one of (11) to (16) above, in which
the participant display is appended with a character indicating a number of statements of a corresponding participant.

(18) The information processing device according to any one of (11) to (17) above, in which
the conversation line has a thickness according to a number of conversations between corresponding participants.

(19) The information processing device according to any one of (11) to (18) above, in which
the conversation line is appended with a character indicating a number of conversations between corresponding participants.

(20) The information processing device according to any one of (11) to (19) above, further including
a display unit that displays the planar map image generated by the image generation unit.

(21) The information processing device according to any one of (11) to (20) above, further including
a server that holds the planar map image generated by the image generation unit.

(22) The information processing device according to any one of (11) to (21) above, further including
a communication unit that transmits the planar map image generated by the image generation unit to a mobile terminal.

(23) An information processing method including:
a voice processing step of detecting, from a voice signal, statements of a plurality of participants of a conversation, by a voice processing unit;
an image processing step of detecting, from an image signal, states of the plurality of participants of the conversation, by an image processing unit; and
a detection step of determining a state of the conversation on the basis of the statements of the plurality of participants and the states of the plurality of participants, by a conversation detection unit.

(24) A program
that causes a computer to function as:
a voice processing means that detects, from a voice signal, statements of a plurality of participants of a conversation;
an image processing means that detects, from an image signal, states of the plurality of participants of the conversation; and
a determination means that determines the statements of the plurality of participants and the states of the plurality of participants.

REFERENCE SIGNS LIST

100 Information processing device
101 Voice processing unit
102 Image processing unit
103 Determination unit
200 Information processing device
201-1 to 201-N Camera
202-1 to 202-M Microphone
203 Image and voice control system
204 Monitor
205 Server
206 Mobile terminal
231 Control unit
232 User operation unit
233 Voice processing unit
234 Image processing unit
235 Determination unit
236 Image generation unit
237 Communication unit

The invention claimed is:

1. An information processing device, comprising:
voice processing circuitry configured to detect, from a voice signal, statements and and utterances of a plurality of people;
image processing circuitry configured to detect, from an image signal, states of the plurality of people, wherein the image processing circuitry is further configured to detect nodding responses, as at least one of the states of the plurality of people; and
processing circuitry configured to determine a conversational state by determining that there is a conversation between a first person and a second person, based on determining that an utterance or a nodding response by the second person was made at a second time after a first time at which the first person made a statement, wherein the voice processing circuitry is further configured to measure a sound volume from the voice signal, and determine that the statement is made, when a state with a measured sound volume equal to or higher than a threshold value continues for a certain period of time or longer, and determine that the utterance was made, when a state with the measured sound volume equal to or higher than the threshold value is kept for less than the certain period of time.

2. The information processing device according to claim 1, wherein the conversational state determined by the processing circuitry includes a conversational relationship between the first person and the second person.

3. The information processing device according to claim 1, wherein the conversational state determined by the processing circuitry includes at least one of content of statements of participants of the conversation, a number of times of the statements, or a duration of the statements.

4. The information processing device according to claim 1, wherein the conversational state determined by the processing circuitry includes establishment of the conversation between the first person and the second person.

5. The information processing device according to claim 1, wherein the image processing circuitry is further configured to detect a direction in which the second person is looking, from an orientation of a face or a direction of a line of sight of the second person.

6. The information processing device according to claim 1, further comprising image generation circuitry configured to generate a planar map image of a space used for the conversation, wherein
the planar map image contains a participant display indicating each of participants participating in the conversation, and
the planar map image contains a conversation line connecting two corresponding participant displays based on the conversation that has been detected.

7. The information processing device according to claim 6, wherein
the image processing circuitry is further configured to process the image signal to further detect a position of the first and second persons participating in the conversation, and
the image generation circuitry is further configured to alter a position of the participant display indicating the first and second persons on the planar map image, according to the detected position of the first and second persons.

8. The information processing device according to claim 6, wherein the image generation circuitry is further configured to alter a position of the participant display indicating the first and second persons on the planar map image, according to a number of conversations of the first and second persons.

9. The information processing device according to claim 8, wherein the image generation circuitry is further configured to arrange a position of the participant display indicating the first and second persons closer to a center of the planar map image as a number of conversations increases.

10. The information processing device according to claim 8, wherein the image generation circuitry is further configured to make an interval between participant displays of two participants shorter as a number of conversations between the two participants increases.

11. The information processing device according to claim 6, wherein the participant display has a size according to a number of statements of a corresponding participant.

12. The information processing device according to claim 6, wherein the participant display is appended with a character indicating a number of statements of a corresponding participant.

13. The information processing device according to claim 6, wherein the conversation line generated by the image generation circuitry has a thickness according to a number of conversations between corresponding participants.

14. The information processing device according to claim 6, wherein the conversation line generated by the image generation circuitry is appended with a character indicating a number of conversations between corresponding participants.

15. The information processing device according to claim 6, further comprising a display to display the planar map image generated by the image generation circuitry.

16. The information processing device according to claim 6, further comprising a server that stores the planar map image generated by the image generation circuitry.

17. The information processing device according to claim 6, further comprising
a communication interface configured to transmit the planar map image generated by the image generation circuitry to a mobile terminal.

18. An information processing method, comprising:
detecting, by voice processing circuitry from a voice signal, statements and utterances of a plurality of people;
detecting, by image processing circuitry from an image signal, states of the plurality of people, wherein the image processing circuitry is further configured to detect nodding responses, as at least one of the states of the plurality of people; and
determining that there is a conversation between a first person and a second person, based on determining that an utterance or a nodding response by the second person was made at a second time after a first time at which the first person made a statement,
wherein the voice processing circuitry is further configured to measure a sound volume from the voice signal, and determine that the statement is made, when a state with a measured sound volume equal to or higher than a threshold value continues for a certain period of time or longer, and determine that the utterance was made, when a state with the measured sound volume equal to or higher than the threshold value is kept for less than the certain period of time.

19. A non-transitory computer-readable medium storing a program that, when executed by a computer, causes the computer to perform a method comprising:
detecting, by voice processing circuitry of the computer from a voice signal, statements and utterances of a plurality of people;
detecting, by image processing circuitry of the computer from an image signal, states of the plurality of people, wherein the image processing circuitry is further configured to detect a nodding responses, as at least one of the states of the plurality of people; and
determining that there is a conversation between a first person and a second person, based on determining that an utterance or a nodding response by the second person was made at a second time after a first time at which the first person made a statement,
wherein the voice processing circuitry is further configured to measure a sound volume from the voice signal, and determine that the statement is made, when a state with a measured sound volume equal to or higher than a threshold value continues for a certain period of time or longer, and determine that the utterance was made, when a state with the measured sound volume equal to or higher than the threshold value is kept for less than the certain period of time.

* * * * *